(12) United States Patent
Överby et al.

(10) Patent No.: US 8,188,745 B2
(45) Date of Patent: May 29, 2012

(54) PRECISE LOCATION AND ORIENTATION OF A CONCEALED DIPOLE TRANSMITTER

(75) Inventors: Johan Överby, Milpitas, CA (US);
James W. Waite, Los Gatos, CA (US);
Dimitar Gargov, Merced, CA (US);
Kun Li, Cupertino, CA (US)

(73) Assignee: Metrotech Corporation Inc., Santa Clara, CA (US)

( * ) Notice: Subject to any disclaimer, the term of this patent is extended or adjusted under 35 U.S.C. 154(b) by 689 days.

(21) Appl. No.: 12/315,696

(22) Filed: Dec. 5, 2008

(65) Prior Publication Data

US 2010/0141261 A1 Jun. 10, 2010

(51) Int. Cl.
*G01V 3/08* (2006.01)
(52) U.S. Cl. .......................................... 324/326; 342/22
(58) Field of Classification Search .......... 324/326–329; 342/42
See application file for complete search history.

(56) References Cited

U.S. PATENT DOCUMENTS

| | | | |
|---|---|---|---|
| 5,260,659 A | 11/1993 | Flowerdew et al. |
| 5,892,360 A | 4/1999 | Willer et al. |
| 6,065,219 A | 5/2000 | Murphey et al. |
| 6,250,402 B1 | 6/2001 | Brune et al. |
| 6,710,708 B2 | 3/2004 | McClelland et al. |
| 7,009,399 B2 | 3/2006 | Olsson et al. |
| 7,049,820 B2 | 5/2006 | Mercer |
| 7,057,383 B2 | 6/2006 | Schlapp et al. |
| 7,062,414 B2 | 6/2006 | Waite et al. |
| 7,113,124 B2 | 9/2006 | Waite |
| 7,120,564 B2 | 10/2006 | Pacey |
| 7,154,273 B2 | 12/2006 | Mercer |
| 7,356,421 B2 | 4/2008 | Gudmundsson et al. |
| 7,443,154 B1 | 10/2008 | Merewether et al. |
| 7,834,801 B2 | 11/2010 | Waite et al. |
| 2006/0055584 A1 | 3/2006 | Waite et al. |
| 2007/0085698 A1 | 4/2007 | Royle |
| 2007/0176603 A1 | 8/2007 | Brune et al. |
| 2009/0128156 A1 | 5/2009 | Li et al. |

OTHER PUBLICATIONS

PCT International Search Report and the Written Opinion mailed Apr. 8, 2010, in related International Application No. PCT/US2009/066460.
M.F. Gard, "Magnetic Field Sensing in the Underground Construction Environment", Sensors for Industry Conference, Houston, Texas, Nov. 19-21, 2002.
J.E. Mercer, "Walk-over Locating Technology", No-Dig 2000 Conference, Perth, Australia, 2000.
M.S. Grewal et al., *Kalman Filtering: Theory and Practice Using MATLAB*, Second Edition, John Wiley & Sons, Inc., 2001.

*Primary Examiner* — Jay Patidar
(74) *Attorney, Agent, or Firm* — Haynes and Boone, LLP

(57) ABSTRACT

A method for determining the location of an underground sonde transmitter is disclosed. In some embodiments, the method includes measuring a set of complex electromagnetic field magnitude and phase strengths at one or more of positions while traversing a target sonde path at any angle using one or more electromagnetic coil sensors, modeling a set of expected complex electromagnetic strengths of a hypothetical sonde at the one or more of positions for one or more of the electromagnetic coil sensors, the set of expected electromagnetic field values corresponding to a model for the target sonde, and estimating parameters related to the target sonde based on the residual error between the measured set of complex electromagnetic field values and the modeled set of expected complex electromagnetic field strengths, wherein a final estimated parameter set is determined after the residual error has converged to a minimum tolerance.

14 Claims, 19 Drawing Sheets

X-Direction Slice at Z=0.45, center=1.09, pitch=1.02°, roll=3.58°, yaw=-7.17°

PRECISE LOCATION AND ORIENTATION OF A CONCEALED DIPOLE TRANSMITTER

BACKGROUND

1. Field of the Invention

The present invention relates to a method and apparatus for detecting a location of concealed dipole transmitters and, in particular, to the precise determination of the location and orientation of such transmitters without restriction on the geometrical relationship between a receiver and the transmitter.

2. Discussion of Related Art

Underground pipes and conduits are often buried and not readily accessible. It is often necessary to locate these concealed utility conduits in order to repair and replace them. It is also important to know the location of underground utilities so that excavators can avoid them while excavating an area. Further, it is often necessary to locate the position of a drill head of a directional boring machine capable of trenchless underground drilling during a boring operation. If the location of buried utilities and/or underground drill heads are not accurately known during excavation and/or boring, substantial destruction to property, serious physical harm to a person, or even death may occur.

There are various ways to locate underground utilities and underground drill heads and therefore mitigate the harmful results discussed above, for example, using electromagnetic (EM) locators. EM locators typically include a receiver and a transmitter, which may be a radiating underground conductor. In some systems, a radiating underground conductor can be a sonde, a battery operated cylindrical device having a length of a few centimeters to few decimeters. A typical sonde has a single coil oriented along the cylindrical axis (also known as the dipole axis), with an integrated tone transmitter that causes an induced EM field to emanate symmetrically from the sonde. An aboveground EM locating receiver detects and processes the signal, and presents transmitter location information to a user. In this manner, an underground conduit pipe can be traced aboveground as a sonde is pulled or pushed through from one end, or a trenchless underground boring tool can be guided from information derived from the position of the sonde. Conventional EM locators, however, do not provide for precise determination of the location and orientation of sondes and exhibit some practical use limitations relating to the geometric relationship between the EM locator receiver and the sonde transmitter.

Therefore, there is a need for refinement of underground sonde location systems to allow for more precise determination of the location and orientation of such sondes. The more precise a locating can be, the less likely that substantial destruction to property, serious physical harm to a person, or even death may occur.

SUMMARY

Consistent with some embodiments of the present invention, a method for determining the location and orientation of a sonde includes measuring a set of complex electromagnetic field magnitude and phase strengths at one or more positions while traversing a target sonde path at any angle using one or more electromagnetic coil sensors, modeling a set of expected complex electromagnetic strengths of a hypothetical sonde at each of the one or more positions for one or more of the electromagnetic coil sensors, the set of expected electromagnetic field values corresponding to a model for the target sonde, and estimating parameters related to the target sonde based on the residual error between the measured set of complex electromagnetic field values and the modeled set of expected complex electromagnetic field strengths, wherein a final estimated parameter set is determined after the residual error has converged to a minimum tolerance.

Consistent with some embodiments of the present invention, a multi-axis dipole transmitter apparatus includes a plurality of transmission axes, each transmission axis includes a dipole antenna arranged so that its dipole axis is unique to the other transmission axes configured inside a cylindrical enclosure, and a multi-frequency generation circuit capable of generating an output transmission frequency unique to the axis configured inside the cylindrical enclosure.

Consistent with some embodiments of the present invention, a sonde locator includes a plurality of electromagnetic coil detectors configured to measure the electromagnetic field magnitude and phase generated by least one dipole transmitter axis of a target sonde, the plurality of electromagnetic coil sensors being at arbitrary orientation to the target sonde, circuitry coupled to receive signals from the plurality of electromagnetic coil sensors and provide quadrature signals indicating a set of measured complex electromagnetic field strengths related to each electromagnetic coil sensor at the receiver and at least one transmitter dipole direction, a position locator for indicating a precise position of the sonde locator, a processor coupled to receive the complex electromagnetic field strength and phase and the position and calculate parameter values related to the target sonde, and a display coupled to the processor, the display indicating to a user the values related to the target sonde, wherein the processor includes software for measuring a set of complex electromagnetic field magnitude and phase strengths at one or more positions determined by the position locator while traversing a target sonde path at any angle using one or more of the electromagnetic coil sensors, modeling a set of expected complex electromagnetic strengths of a hypothetical sonde at each of the one or more positions determined by the position locator for one or more of the electromagnetic coil sensors, the set of expected electromagnetic field values corresponding to a model for the target sonde, and estimating parameters related to the target sonde based on the residual error between the measured set of complex electromagnetic field values and the modeled set of expected complex electromagnetic field strengths, wherein a final estimated parameter set is determined after the residual error has converged to a minimum tolerance.

Consistent with some embodiments of the present invention, a method for tracking the location and orientation of a dipole transmitter target sonde between two arbitrary points comprising a known beginning point and a known ending point includes computing a first optimal path for the target sonde between the beginning point and the ending point, measuring a set of complex electromagnetic field magnitude and phase values at one of a plurality of incremental positions of target sonde following the optimal path using a plurality of electromagnetic coil sensors, generating a set of expected complex electromagnetic field values of a hypothetical sonde at the one incremental position based on an extended Kalman filter for each of the electromagnetic coil sensors, the set of expected complex electromagnetic field values corresponding to a model for the target sonde, and estimating a revised optimal path of the target sonde from the one incremental position to the ending point based on the residual error between the measured field values and the expected field values.

These and other embodiments are further discussed below with reference to the following figures.

Figure 1:
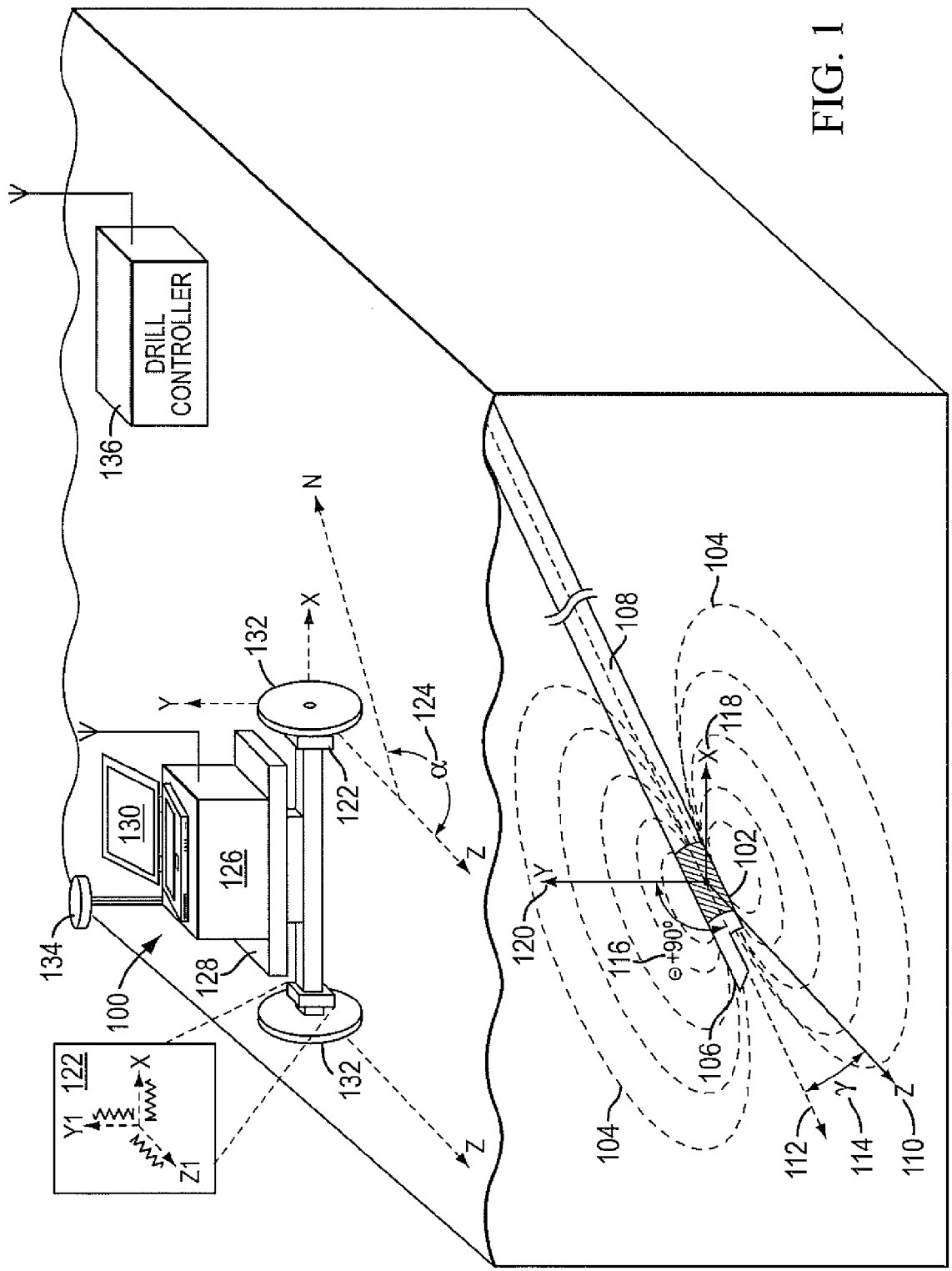
FIG. 1 illustrates the aboveground use of a sonde locating receiver consistent with some embodiments of the present invention to locate the position of an underground sonde.

In the figures, elements having the same designation have the same or similar functions.

DETAILED DESCRIPTION

As discussed above, EM locators typically include a receiver and a transmitter, which may be a radiating underground conductor. In some applications, a radiating underground conductor is a linear pipe or cable and the EM locator is configured to estimate the position of the underground pipe or cable. Sonde position estimation differs from the methods used for linear pipe or cable location, however, because the EM field emitted by the sonde is three dimensional and, accordingly, represented by magnetic dipole equations, which describe the decaying field strength of the EM field as the cube of the distance from the sonde. See e.g., Gard, "Magnetic Field Sensing in the Underground Construction Environment", Sensors for Industry Conference, Houston, Tex., November 2002 ("Gard"). Traditional EM locators designed for locating a continuous conducting pipe or cable designed to function as a transmitter have a single measurement axis and thus suffer from the "ghost" problem. See. e.g., Mercer, "Walkover Locating", No-Dig 2000 Conference, Perth, Australia. The "ghost" problem occurs due to the ambiguity presented when a one-dimensional receiving coil of a traditional EM locator is passed over an underground sonde in a direction parallel to the path of travel.

Different location methodologies have been developed to mitigate the effects of the "ghost" problem. For example, U.S. Pat. No. 7,009,399 provides for an EM locator that utilizes a 3-dimensional (3-D) receiver coil that reduces effects attributable to the "ghost" problem by calculating an EM field magnitude vector and corresponding EM field angles that unambiguously point to a sonde position. However, as with other peak detection locate methods, this "omnidirectional" detection method can lead to poor accuracy when the sonde is deep and the peak signal strength changes slowly over a broad area. In addition, this method also does not provide for independent estimates of the sonde orientation. Sonde orientation parameters (e.g., roll, pitch, and yaw) are particularly important in underground directional boring applications, for instance in providing steering guidance to the directional boring equipment operator.

A more precise method to determine the position and depth of an underground sonde is called the "locate point method" which is generally described, for example, in U.S. Pat. No. 7,049,820. The locate point method utilizes two distinct points located at ground level where the EM field flux lines are vertical and converge to and from the poles of the sonde. These two distinct points are located on the axis of travel of the sonde transmitter behind and in front of the sonde's location. By determining the location of these two distinct points, the depth and position of the sonde may be determined by inference using the locate point method.

As noted above, sonde orientation parameters are particularly important in steering underground directional boring equipment. Yaw angle (i.e., "yaw" or "azimuth"), given by the deviation of the path of travel of the sonde from the planned path (i.e., the ideal path), may also be determined using the locate point method as the line between the two distinct locate points is coincident with the dipole axis of the sonde transmitter. Further, pitch angle (i.e., "pitch" or "inclination"), may be measured locally at the sonde and sent to the surface via a telemetry process.

Unfortunately, using the locate point method, the accuracy of the determined sonde depth and position is dependent on the accuracy of the determined sonde pitch angle. In conjunction with the measured distinct locate points, the locate receiver uses the locally measured pitch to compute the depth and centerline position of the sonde. As the locate point method requires knowledge of the position of the two distinct locate points as well as the locally measured transmitter pitch, the method belongs to a class of sonde locating solutions that requires a predefined geometrical relationship between the receiver and the transmitter, thus limiting its practical applicability. Further problems with the locate point method can occur when one or both of the locate points are physically inaccessible. This may occur, for example, when the sonde is very deep (e.g., as in directional underground boring applications involving river crossings) or when the underground sonde is in close proximity to buildings and other places that are difficult to reach aboveground with a sonde locating receiver. In such circumstances, estimates of the sonde's underground location using the locate point method have reduced precision.

Other limitations associated with the locate point method in the context of underground directional boring applications include determining how to steer the drill head from a known location to a subsequent forward location. In addition, the locate point method typically utilizes known aboveground positions of the sonde locate receiver as a guide to steering the drill head to a specific forward location. As noted above, this steering requirement presents issues when certain aboveground positions are obstructed or otherwise inaccessible. Conventional solutions, as provided in U.S. Pat. No. 6,250,402, do not allow for target positions other than the position represented by the distinct forward locate point. Even more contemporary solutions, such as those disclosed in U.S. Patent Publication No. 2007/0176603, still place constraints on the sonde movement as a relative function of the sonde's immediate position, pitch, and yaw, and are therefore sensitive to drift as offsets in these parameter estimates accumulate.

Other methods to determine the position and depth of an underground sonde include "flux orientation locating" methods which are generally described, for example, in U.S. Pat. No. 7,154,273. Flux orientation locating methods operate by detecting a change in sign of the magnetic field at nulls in the detected field magnitudes via either deduction or direct wireline measurement of the received signal phase relative to the transmitter phase. Detecting this sign change helps to eliminate the slope ambiguities that occur as the receiver is traversed in the sonde field between the front and rear distinct locate points as well as in front of and behind these points to some degree. However, flux orientation locating methods also require locating the two distinct locate points and, like the aforementioned locate point method, are limited to a predefined geometrical relationship between the receiver and sonde transmitter.

For underground directional boring applications, a complete description of the sonde orientation also requires roll information of the sonde about its cylindrical axis. Angular rotation of the drill head may be used to provide feedback to the operator for steering purposes, as with certain underground boring drill heads, a positive or negative roll of the sonde about its axis may be used to steer the sonde left or right. Conventional directional drilling systems often measure this roll information using a roll sensor integrated locally on the sonde capable of transmitting roll angle and pitch information to the surface using a telemetry process.

Roll and pitch parameters measured locally at the sonde, however, are problematic for a variety of reasons. In addition to adding cost, harsh environmental conditions close to the drill head pose several issues in the context of local roll and pitch measurement. For example, elevated temperatures and vibration present significant design challenges in achieving calibrated and stable local sensor measurements. Lower cost solid state roll and pitch sensors increase design complexities as temperate variations can directly affect their accuracy and reliability. Moreover, locally measured roll and pitch data are often noisy due to high mechanical vibration forces experienced by the sonde/drill head and therefore require local filtering of the measured data prior to transmission to the surface. Such filtering can lead to latency or drift errors that bias estimates used for positioning in the locate point method. Lastly, measurement ranges using (i.e., maximum to minimum measurement of pitch and roll) and precision are often limited for locally embedded pitch and roll sensors. Conventional sondes may support a pitch range of only $\pm 10°$, which limits the locating and tracking of such sondes to only horizontal applications.

In addition, magnetic field distortion can bias any location method that relies on a fixed physical geometric model of the magnetic field shape to derive physical parameters. For example, eddy currents in the ground can distort the flux lines away from the ideal dipole shape, resulting in positioning errors for simple methods that rely on finding specific points in the field, as required by the locate point and flux orientation locate methods. Conventional systems are susceptible to such distortions and lack mechanisms for detecting when field distortion is present and when position estimates may have larger errors.

Conventional sonde locating solutions also do not provide a user with error bounds associated with determinations of sonde position and orientation. Although customary in the GIS and geodetic worlds, mapping solutions of underground sondes conventionally provide georeferenced X-Y (e.g., latitude-longitude) positions and depths without any statement of accuracy. Because of potential field distortions, the accuracy of any particular estimate of sonde depth and centerline position can be biased when using physical models that are not adapted to local conditions.

Finally, calibration of a conventional sonde locating system is typically based upon a one or two point measurement, either with the sonde exposed aboveground or buried at known depth (e.g., usually at the entry pit for the horizontal directional bore). Without increasing the calibration time, it is desirable to increase the number of calibration points, thereby reducing random bias, and to perform the calibration with the sonde fully within the ground so that effects related to ground conductivity and composition are taken into account.

In light of the foregoing, improvements over conventional methods are desirable in the measurement accuracy of sonde location and orientation. Particularly, improvements derived from model-based precise location methods in the context of underground line locating may be utilized to improve the accuracy of sonde measurements. In some embodiments of the present invention, such methods are utilized in comparing a measured EM field at ground level in a minimization process to an EM field model for the transmitter being detected. Adaptation via nonlinear optimization may be used to tailor the state parameters in the model to the EM field measurements and the best set of state parameters for a given measurement set may be attributed with the estimated location of the transmitting sonde. Residual errors in the optimization process may be used to provide an indication of the confidence in the state parameter estimates.

In addition to nonlinear optimization, embodiments of the invention may utilize measurements of both magnitude and phase of the EM field emitted by the sonde transmitter. By measuring both the magnitude and phase, ambiguities in position deduction may be resolved such that the EM field can be measured at any location without knowledge of distinct locate points or the direction of the sonde axis, as is required by the locate point method discussed above. Accordingly, systems and methods consistent with embodiments of the invention do not require a predefined geometrical relationship between the locating receiver and the sonde transmitter. Moreover, knowledge of the precise location of locate points are also not required to generate a sonde position estimation.

In some embodiments, the locating receiver is configured to recover a phase reference that is synchronized with the EM signal transmitted by the sonde. In some embodiments that utilize a battery operated sonde with no wired connection to the surface, the phase reference may be recovered through demodulation of the signal select reference. Methods utilizing signal select modulation, as described in U.S. Pat. No. 7,062,414 (the '414 patent), by James W. Waite and Johan D. Överby and further described in U.S. Pat. No. 7,057,383 ('the '383 patent), by Hubert Schlapp and Johan D. Överby, both of which are assigned to Metrotech Corporation and are herein incorporated by reference in their entirety, are capable of providing an indication of the a detected EM signal's direction (e.g., phase) as well as its strength (e.g., magnitude). In the context of sonde detection, embodiments of the present invention may utilize signal select modulation, particularly in determining the direction of a measured EM signal, to in part resolve position ambiguities that are inherent in the previously described "ghost" problem. Signal select modulation may be used to deploy the transmitter and receivers independently without common clock synchronization, and still allow phase referenced measurements at the receiver.

While utilizing a 3-D coil receiver to measure an EM signal emitted by a sonde transmitter eliminates some measurement ambiguities, each individual measurement axis of the 3-D coil receiver may still exhibit some inherent measurement position ambiguity (e.g., ambiguity caused by a lack of knowledge of whether the receiver is in front of or behind the sonde) if only the magnitude of the signal is measured. In the absence of signal interference and distortion, the phase of the EM field measured at the ground surface emanating from an underground transmitting dipole (e.g., a sonde) may be either 0° or 180°. Accordingly, the quadrature signals can be zero and the inphase component of the measured EM field can be negative. However, in practical situations, the quadrature signals may not be zero. In such situations, the non-zero quadrature signal measurement may be an indication of signal interference from inductive and capacitive coupling of the sonde transmitter signal to other radiating sources. Such a measurable phase offset may be used as an indicator of EM field distortion and can be used to provide improved estimates of sonde's position and the expected error in that position.

In some embodiments, other methods of measuring the phase of an EM signal emitted by a sonde may be utilized. For example, synchronized transmit and receive cycles using a tethered (e.g., wired) sonde, or transmission of a pilot tone and pseudorandom training sequence in a similar method as digital subscriber line (DSL) modem systems may be utilized.

Embodiments of the present invention may utilize various configurations of transmit and receive dipole antennas. For example, a transmitter may include a single dipole antenna capable of emitting an EM field having an axis that is coincident with the longitude axis of the sonde. Separately, the sonde may transmit locally measured sonde pitch and roll information to the receiver over a telemetry link. In some embodiments, the sonde locate receiver may include two 3-D coil clusters capable of measuring an EM field in three dimensions at two points in space (generally at ground level). Using the measured EM field, the locate receiver may estimate the position of the sonde and/or the yaw angle of the sonde from the reference (i.e., desired) path.

In some embodiments, the sonde transmitter may transmit EM fields in a single or in multiple dimensions. For example, a sonde transmitter may transmit EM fields in two and/or three dimensions from the sonde. Similarly, the sonde locate receiver may measure EM fields in a single or in multiple dimensions at one or more receiver 3-D EM coil cluster(s).

Sonde position and orientation parameters may include a plurality of parameter states. For example, three sonde position parameters may describe the position of the sonde in x, y, z space, and three sonde orientation parameters may describe the sonde's orientation, known as roll, pitch, and yaw. Sonde parameter states may be estimated using a model optimization method. In some embodiments, one or more receiver 3-D EM coil clusters may be utilized to take redundant measurements which may be used to improve sonde position estimation confidence.

In some embodiments, geometric dimensions may be independently described by differing radiation models, and may conform to any EM field distribution including, for example, a dipole EM field distribution. In some embodiments, the two axes orthogonal to the sonde radial axis may have EM flux lines that depend on the slot geometry of the drill string. Since a separate model can be defined for each dimension in the multi-dimensional transmitter, the optimization method may proceed in the same manner, with each dimension separately optimized against a best fitted model.

Sonde Location

FIG. 1 illustrates the aboveground use of a sonde locating receiver 100 consistent with some embodiments of the present invention to locate the position of an underground sonde 102. Particularly, the sonde illustrated in FIG. 1 includes a single transmitter capable of emitting an EM field 104. In accordance with some embodiments of the present invention, a model-based precise locating method may be used to accurately locate and map sonde 102 (e.g., an underground dipole transmitter) in georeferenced (e.g., earth referenced) coordinates. Further, the method may be used to describe the sonde's orientation (e.g., roll, pitch, yaw) for directional drilling steering purposes.

Sonde 102 may be integrated behind a drill head 106 at the end of a drill string 108. Using a locating receiver 100, which in some embodiments may be cart-based, sonde 102 may be located and tracked. The sonde locating receiver 100 illustrated in FIG. 1 is a cart-based receiver. Embodiments of a sonde location system consistent with the present invention, however, may be integrated in hand-held devices, mounted on vehicles, or integrated in any device that can be moved relative to target sonde 102.

The forward direction of the sonde locate receiver 100 (the "cart") may be denoted as the z direction, in a translated plane coincident with z-axis 110. When the cart is moving forward in a direction parallel to the forward motion of the drill head 106, illustrated in FIG. 1 as direction 112, then the sonde 102 dipole axis may be the same z-axis. However sonde 102 can have arbitrary orientations with respect to the cart receiver 100 (e.g., pitch denoted as $\theta$ 114, yaw denoted as $\gamma$ 116, and roll denoted as $\phi$. In some embodiments, the orientation of the coordinate system of the receiver/transceiver geometry illustrated in FIG. 1 may be at the center of sonde 102 and axes of the coordinate frame (e.g., x-axis 118, y-axis 120, and z-axis 110) with respect to the origin of the coordinate frame may be in alignment with the above ground axis of EM detector (i.e., receiver) coils 122 included on cart 100. Utilizing global positioning sensors such as, for example, GPS, this "cart-based" coordinate frame may be translated into a georeferenced coordinate frame (e.g., an Earth-based coordinate frame) described by, for example, latitude, longitude, and elevation parameters. Angle $\alpha$ 124, shown in FIG. 1, illustrates one parameter that may be utilized in the coordinate frame translation. If the cart is tilted with respect to mean-sea-level (MSL) of the Earth-based coordinate frame, parameters other than $\alpha$ 124 may be required to translate between coordinate frames. Translation between the cart-based coordinate frame and Earth-based coordinate frame may be achieved using techniques commonly implemented and well known in geographical surveying.

As shown in FIG. 1, cart-based locate receiver 100 may include cart frame 128, display 130, one or more wheels 132, EM detector coils 122, and locator receiver electronics 126. In some embodiments, locator receiver electronics 126 may include at least some of the components included illustrated in FIG. 2 and described in further detail below. In some embodiments, EM detector coils 122 may be internally integrated within locator receiver electronics 126. Further, in some embodiments locator receiver electronics 126 may include systems for determining the location of cart-based location receiver including, for example, real-time kinematic (RTK) GPS, which may include GPS antenna 134, odometers, gyroscopes, inertial sensors, accelerometers, digital level sensors, compasses, and/or precise survey grade location equipment (e.g., laser rangefinders, ultrasonic rangefinders, and/or on-board reflectors capable of integration with a laser theodolite total station system). In certain embodiments, the systems for determining the location of cart-based location receiver 100 may also provide confidence information related to the accuracy of the estimated location of the cart 100. The location of the cart 100 and any confidence information may be provided to a geographic information system (GIS) mapping platform, which in some embodiments, may be displayed to a user via display 130.

An underground target sonde 102 may be energized by an electric current from onboard transmitter electronics to emit EM field 104. As shown in FIG. 1, cart-based sonde locator 100 may include a pair of EM detector coils 122 mounted on each side of the cart frame 128, and each EM detector coil 122 may include three EM coils configured to provide 3-dimensional electromagnetic field measurement information. In some embodiments, 3-dimensional magnetometers may be used in lieu of and/or in addition to EM coils. In some embodiments, EM detector coils 122 may be mounted on cart frame 128 within the wells of wheels 132, providing the coils some protection as the cart traverses the locate path. In general, cart-based sonde locator 100 may include any number of detector coils 122 positioned in other configurations.

To estimate the location of target sonde 102, several complex electromagnetic field measurements taken by EM detector coils 122 can be performed as cart-based sonde locator 100 is traversed over target sonde 102 in a substantially parallel direction (i.e., substantially parallel with sonde 102), or in a substantially transverse direction (i.e., substantially transverse to the dipole axis of sonde 102). Other traversal paths, however, may be utilized if the path of cart-based locate receiver 100 passes directly over sonde 102 and a sufficiently strong EM field 104 can be detected. These measurements, along with cart 100 location based measurements taken by locator receiver electronics 126, can be compared with a model of the electromagnetic field generated by a hypothetical target sonde as a function of position to estimate the position of target sonde 102. Estimated position parameters of target sonde 102 may include depth, forward position, and horizontal offset of the receiver compared to the planned sonde track. This information may then be provided to a GIS mapping platform, which in some embodiments, may be displayed to a user via display 130.

The model EM field generated by a single hypothetical target sonde consistent with embodiments of the invention may have a nominal dipole field shape. In some embodiments, other model EM fields may be utilized depending on the mechanical configuration the transmitter coils in sonde 102. The results of EM field 104 strength phase and amplitude measurements may be measured by EM detector coils 122 as well as location measurements for cart location systems may be provided to a model optimization module that takes into account that the complex EM field measurements were measured while traversing the target sonde in a substantially parallel or transverse direction. In this manner, the sonde 102 detection process used by cart-based sonde locator 100 is similar to the previously discussed sonde detection methods that utilize a "walkover" technique, as described in the '383 patent, for electromagnetic field measurements and line (e.g., pipe or cable) location optimization modeling, the difference being that in the measuring sonde 102 location and orientation, measurements are taken as the EM detector coils 122 are moved along or across target sonde 102 and different field models are utilized. Accordingly, the geometrical relationship between sonde 102 and cart 100 necessary to properly locate sonde 102 may not be a strictly predefined condition.

Using the model optimization techniques discussed briefly above and in the '383 patent, an EM field from a candidate model may be compared with the measured EM field 104 and a model may be further optimized to one that best represents the measured EM field 104 which may then be used to provide an estimated position and orientation of sonde 102. An error function can be formed using the mean square error of the final predicted field (e.g., the modeled field) after optimization, compared to the measured data. The results of this comparison may be used to determine confidence information that describes the accuracy of an estimated position of target sonde 102 and its estimated orientation parameters. The estimated location and orientation confidence information may be exported to the GIS system along with estimated target sonde 102 location and orientation parameters and displayed to a user via display 130. Similarly, cart 100 location confidence information provided by cart location determination systems may also be displayed to a user. In some embodiments, georeferenced cart location confidence (e.g., mapping confidence) information may be combined with the estimated target sonde 102 location measurement confidence information to provide an overall confidence measurement for the estimated location of sonde 102 stated in terms of a chosen geographic coordinate system.

In some embodiments, parameters used to describe the position and orientation of the sonde may be represented by the vector $\vec{a}$:

$$\vec{a} = [x, y, z, \theta, \phi, \gamma]$$

wherein,
- x 118, y 120, and z 110 have origins located at the center of sonde 102;
- z is the forward position of the locate receiver 100 with respect to the sonde 102, in the level direction of the desired path of travel. The z-axis 110 may generally be in the same plane as the local definition of mean sea level (MSL), but can differ by the tilt and roll of the cart with respect to the gravitational vector. The z-axis may be coincident with the dipole axis of sonde 102 when the sonde yaw or pitch are both zero;
- x is the off-axis (e.g., side) position of the receiver relative to the z-axis;
- y is the vertical position of the receiver with respect to sonde 102, and may be substantially aligned with a radial vector from the center of the Earth (e.g., the gravitational vector). Because the tilt and roll of the cart can vary with respect to the gravitational vector, a coordinate translation may be performed to relate y to the depth of sonde 102;
- θ 116 is the pitch angle of sonde 102 about the x-axis;
- φ is the roll angle of the sonde 102 about the dipole axis; and
- γ 114 is the yaw angle of sonde 102 about the-y axis, referenced to the coordinate plane z.

As illustrated in FIG. 1, the coordinate system utilized in locating sonde 102 may be "right handed". That is, x is positive to the left of the direction of travel z, with y positive up from the origin, z positive forward from the original, and the sign of the angles defined by the "right hand rule".

Figure 3A:
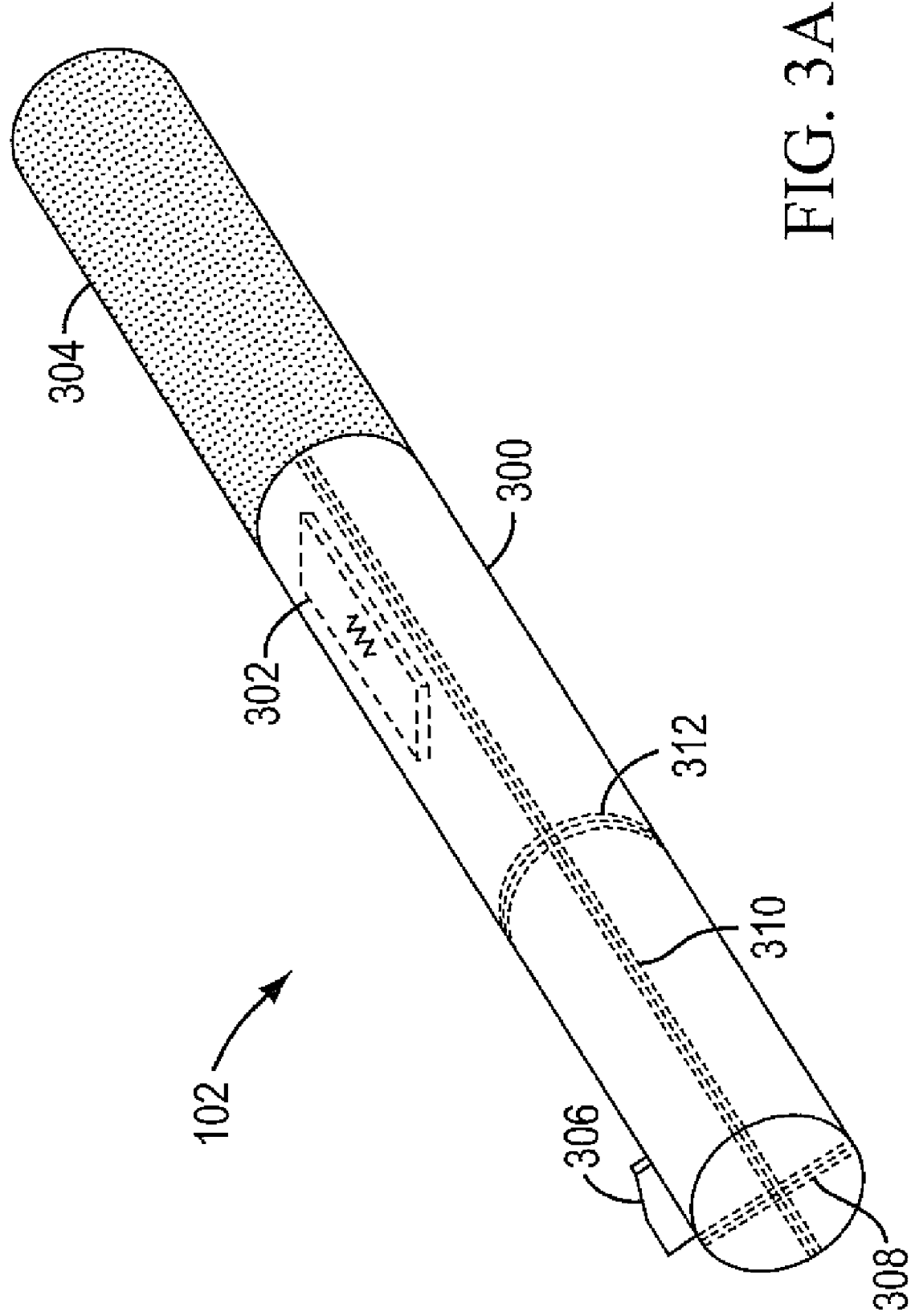
FIG. 3A illustrates a simplified exemplary 3-axis sonde transmitter with embedded electronics and battery capable of emitting and EM field consistent with embodiments of the present invention.

To model an EM field of a hypothetical sonde, the model EM field may be described as one measured at ground level from a 3-D (e.g., x, y, z) receiver coil cluster 122 wherein the orientation parameters of the hypothetical sonde (e.g., θ,φ,γ) are assumed to be zero. In some embodiments, the model EM field, and the ideal measured EM field 104 absent any field distortion, may be that of a multi-axis sonde transmitter 102 in any or all of 3 axes (e.g., x, y, z). An exemplary multi-axis sonde transmitter 102 consistent with embodiments of the present invention is illustrated in FIG. 3A. A multi-axis sonde transmitter 102 differs from conventional sonde transmitters which traditionally only have a single transmit axis.

Modeled and measured EM field strengths may be described in reference to both a transmitted signal orientation and a received signal orientation. For example, field strength measurement/model $h_{xy}$ may describe a situation where the transmitted signal direction is in the x-axis plane and the received signal direction is in the y-axis plane. Using this notation and assuming a Cartesian coordinate system with zero target sonde pitch, roll, and yaw (e.g., θ,φ,γ), following Gard, the field from constant current transmitters may be modeled according to the following:

$$h_{xx} = \frac{A_x(2x^2 - (z^2 + y^2))}{(x^2 + y^2 + z^2)^{5/2}} \quad \text{(Equation 1)}$$

$$h_{xz} = \frac{3A_x xz}{(x^2 + y^2 + z^2)^{5/2}} \quad \text{(Equation 2)}$$

$$h_{xy} = \frac{3A_x yx}{(x^2 + y^2 + z^2)^{5/2}} \quad \text{(Equation 3)}$$

$$h_{yx} = \frac{3A_y xy}{(x^2 + y^2 + z^2)^{5/2}} \quad \text{(Equation 4)}$$

$$h_{yy} = \frac{A_y(2y^2 - (z^2 + y^2))}{(x^2 + y^2 + z^2)^{5/2}} \quad \text{(Equation 5)}$$

$$h_{yz} = \frac{3A_y yz}{(x^2 + y^2 + z^2)^{5/2}} \quad \text{(Equation 6)}$$

$$h_{zx} = \frac{3A_z xz}{(x^2 + y^2 + z^2)^{5/2}} \quad \text{(Equation 7)}$$

$$h_{zy} = \frac{3A_z yz}{(x^2 + y^2 + z^2)^{5/2}} \quad \text{(Equation 8)}$$

$$h_{zz} = \frac{A_z(2z^2 - (x^2 + y^2))}{(x^2 + y^2 + z^2)^{5/2}} \quad \text{(Equation 9)}$$

wherein $A_x$, $A_y$, $A_z$ are transmitter specific parameters.

The above referenced equations be used to represent both the magnitude and phase of the magnetic field strength of a selected transmitter axis (e.g., denoted by the first subscript x, y, or z) at a particular receiver coil axis (e.g., denoted by the second subscript x, y, or z). In some embodiments, an AC excitation current applied to the transmitter coil of the sonde transmitter that may appear in the equations above. This current, however, may be lumped into transmitter specific constant A, as in some embodiments, the excitation current is kept constant by the sonde transmitter electronics. In some embodiments, the constant A may be determined in a calibration step which is discussed in more detail below. Further, if the x and/or y sonde transmitters are not ideal dipole transmitters (e.g., due to the mechanical construction of the sonde), the above described model Equations 1-9 may vary but remain independent of other transmit directions.

Figure 2:
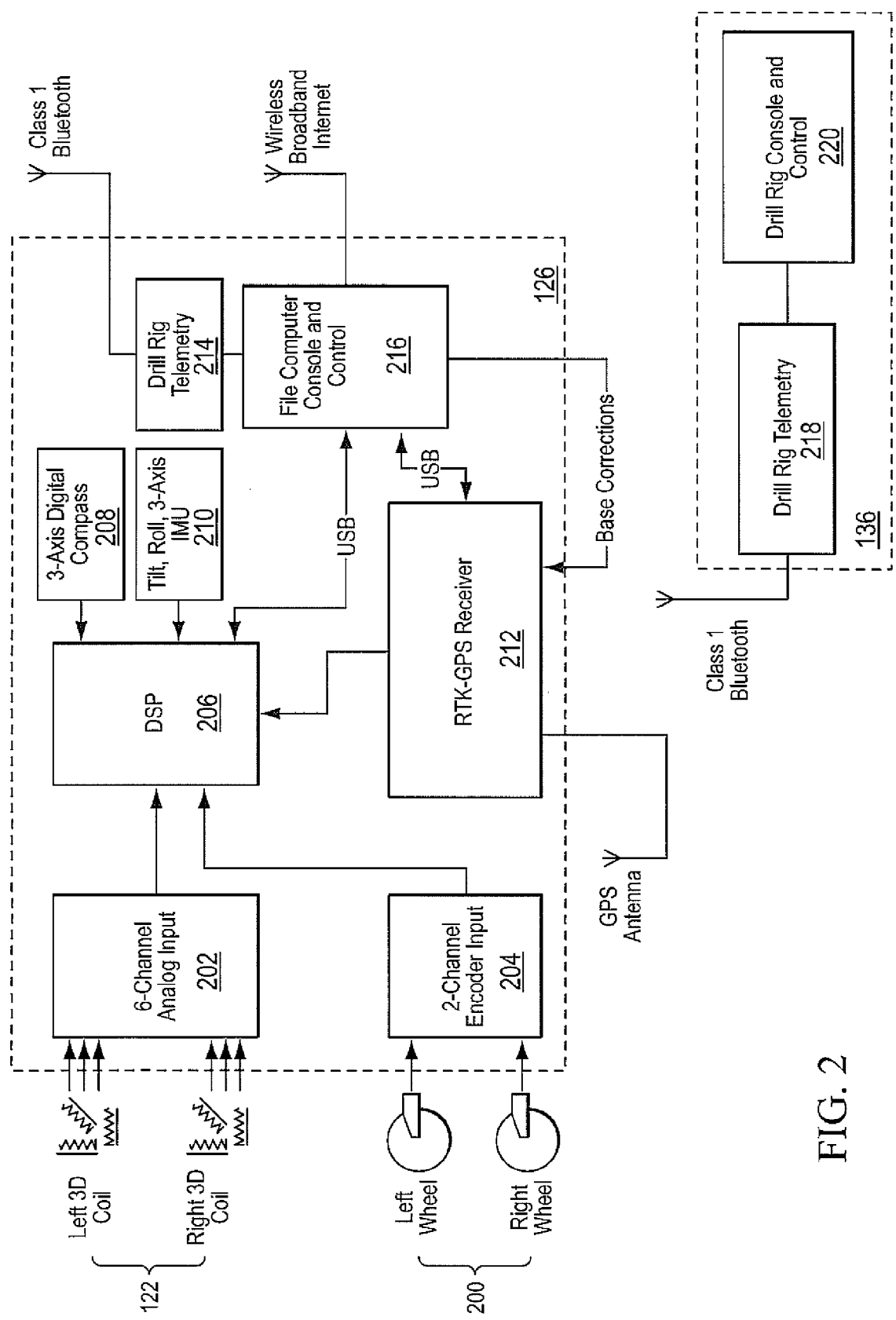
FIG. 2 illustrates a block diagram of sonde locating receiver electronics consistent with some embodiments of the present invention.

FIG. 2 illustrates a block diagram of sonde locating receiver electronics 126 consistent with some embodiments of the present invention. Particularly, FIG. 2 illustrates embodiments of sonde locating receiver electronics 126 configured to measure a 3-D EM field 104 using two 3-D EM receiver coil clusters 122 (e.g., left and right 3-D EM coil clusters). As discussed above, sonde locate receiver 100 may be cart-based, particularly in high accuracy georeferenced coordinate locate applications. In such embodiments, locate receiver 100 may include shaft encoder inputs 200 for one or more of the cart wheels 132 (e.g., left and right cart wheels) capable of precisely measuring cart travel distances over the ground.

As shown in FIG. 2, sonde locating receiver electronics 126 may include an analog input 202 (e.g., a 6-channel analog input) and an encoder input 204 (e.g., a 2-channel encoder input). Analog input 202 and encoder input 204 may provide digital-converted analog EM signals received from EM coils 122 and digital distance measurement information from encoders inputs 200 respectively to a digital signal processing (DSP) unit 206. DSP 206 may also be configured to receive cart orientation and location information from a 3-axis digital compass 208, a 3-axis inertial measuring unit (IMU) 210 capable of measuring, for example, tilt and roll, which may be used to translate measurements taken with respect to the cart-based local coordinate frame to a georeferenced coordinate frame (e.g., an Earth-based coordinate frame). Further, DSP 206 may receive georeferenced cart location information from RTK-GPS receiver 212. Alternatively or in addition, DSP 206 may receive geo-reference cart location information from other location systems including, for example, precise survey grade location equipment. DSP 206 may also be configured to implement the processing methods illustrated in FIGS. 5B and 5C. Further, in some embodiments, all processing in locate receiver 100 may be performed using DSP 206.

Sonde locating receiver electronics 126 may further include a field computer console and control unit 216. Computer console and control 216 may be communicatively coupled with DSP 206 and/or RTK-GPS receiver 212 via USB or the like. In some embodiments, computer console and control 216 may provide RTK-GPS receiver 212 with differential base corrections received from a wireless broadband internet system. Further, computer console and control 216 may be coupled to display 130 and on-board drill rig telemetry 214. Using the measurement and location/orientation information provided to DSP 206, computer console and control 216 may perform a model optimization process with the measured information to determine estimated sonde 102 location/orientation information and provide confidence information relating to the same. This information may then be transmitted to a drill rig telemetry unit 218 included in drill controller 136 by on-board drill rig telemetry 214 via wireless Bluetooth or the like, which may be used by a user of drill rig console and control 220 to steer sonde 102 to an arbitrary point along a predefined path independent of the measurement position of the sonde locating receiver.

FIG. 3A illustrates a simplified exemplary 3-axis sonde transmitter 300 (e.g., sonde 102 in FIG. 1) with embedded electronics 302 and battery compartment 304 capable of emitting EM field 104 consistent with embodiments of the present invention. In particular, FIG. 3A illustrates an underground sonde transmitter 300 having up to three transmit axes 308-312 (e.g., x-axis, y-axis, z-axis). As previously discussed, in some embodiments, sonde 300 is capable of transmitting a 3-D dipole EM field. Battery compartment 304 may be configured to house batteries which power sonde electronics 302. Sonde transmitter 300 may further include key 306 capable of locating the orientation of the sonde in the drill head carrier housing of an underground boring tool.

Figure 3B:
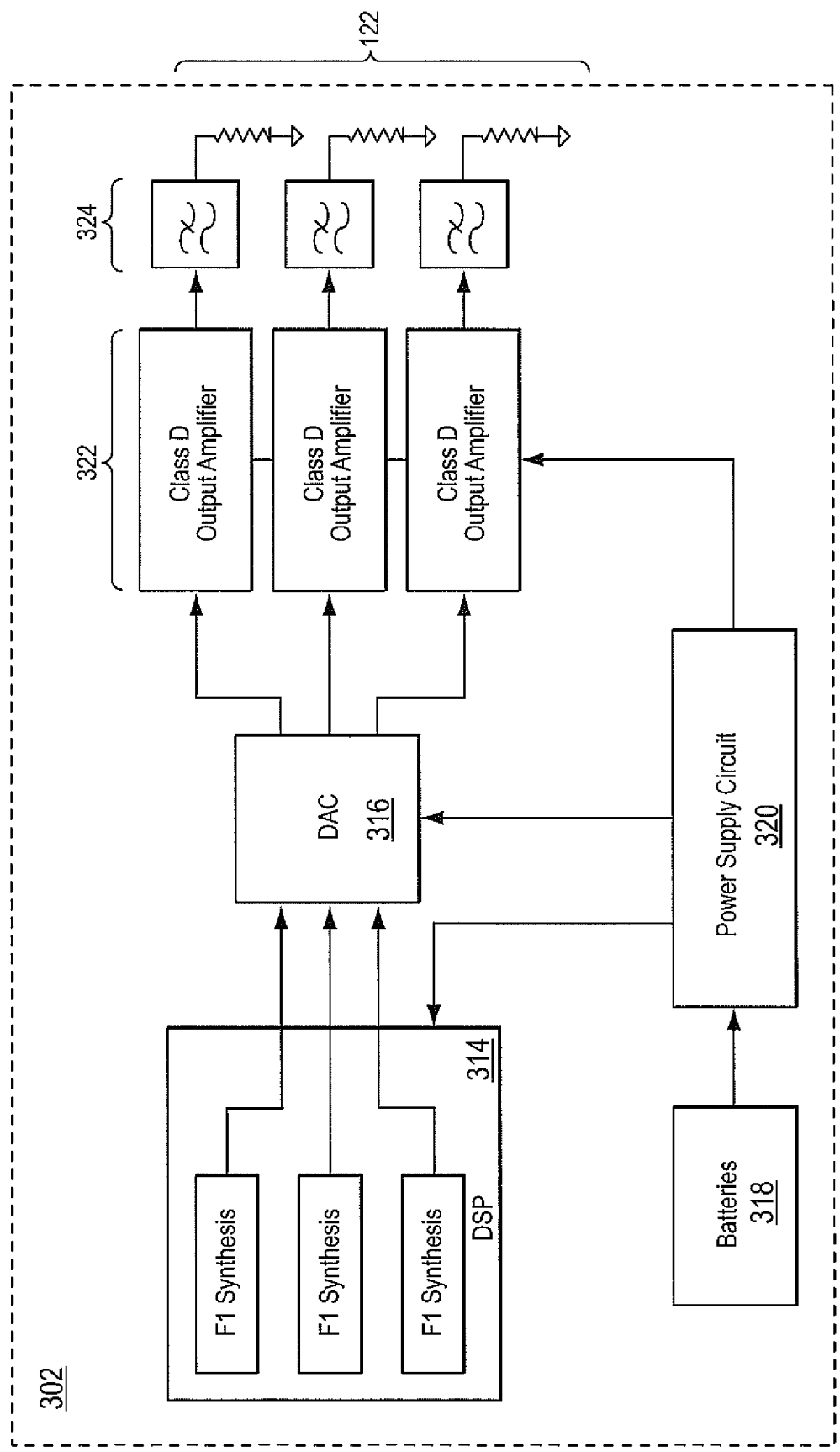
FIG. 3B illustrates a block diagram of embedded electronics included in an exemplary sonde transmitter configured to drive one or more EM coils at one or more modulated frequencies consistent with embodiments of the present invention.

FIG. 3B illustrates a block diagram of embedded electronics 302 included in an exemplary sonde transmitter 300 configured to drive one or more EM coils 122 at one or more modulated frequencies consistent with embodiments of the present invention. Sonde embedded electronics 302 includes a DSP unit 314 configured to generate a signal for each EM coil output channel and digital-to-analog converter (DAC) 316 configured to receive the digital signal provided by DSP 314 and generate corresponding analog signals for each of the one or more EM coil 122 channels. In some embodiments, DSP 314 may provide DAC 316 with three digitally synthesized frequency signals. Each of the EM coil channels may include an output amplifier 322 and an analog filter 324, which in some embodiments may be a low pass filter, and an EM transmitting coil 122. In some embodiments, DSP 314 may be configured to implement the previously described signal select algorithm on a separate carrier frequency for each active output axis (e.g., each of EM coil 122 channels). Further, in some embodiments, a programmable logic device may be used in lieu of or in addition to DSP 314 and DAC 316. Alternatively or in addition to, a direction digital synthesis block may be utilized.

Figure 4A:
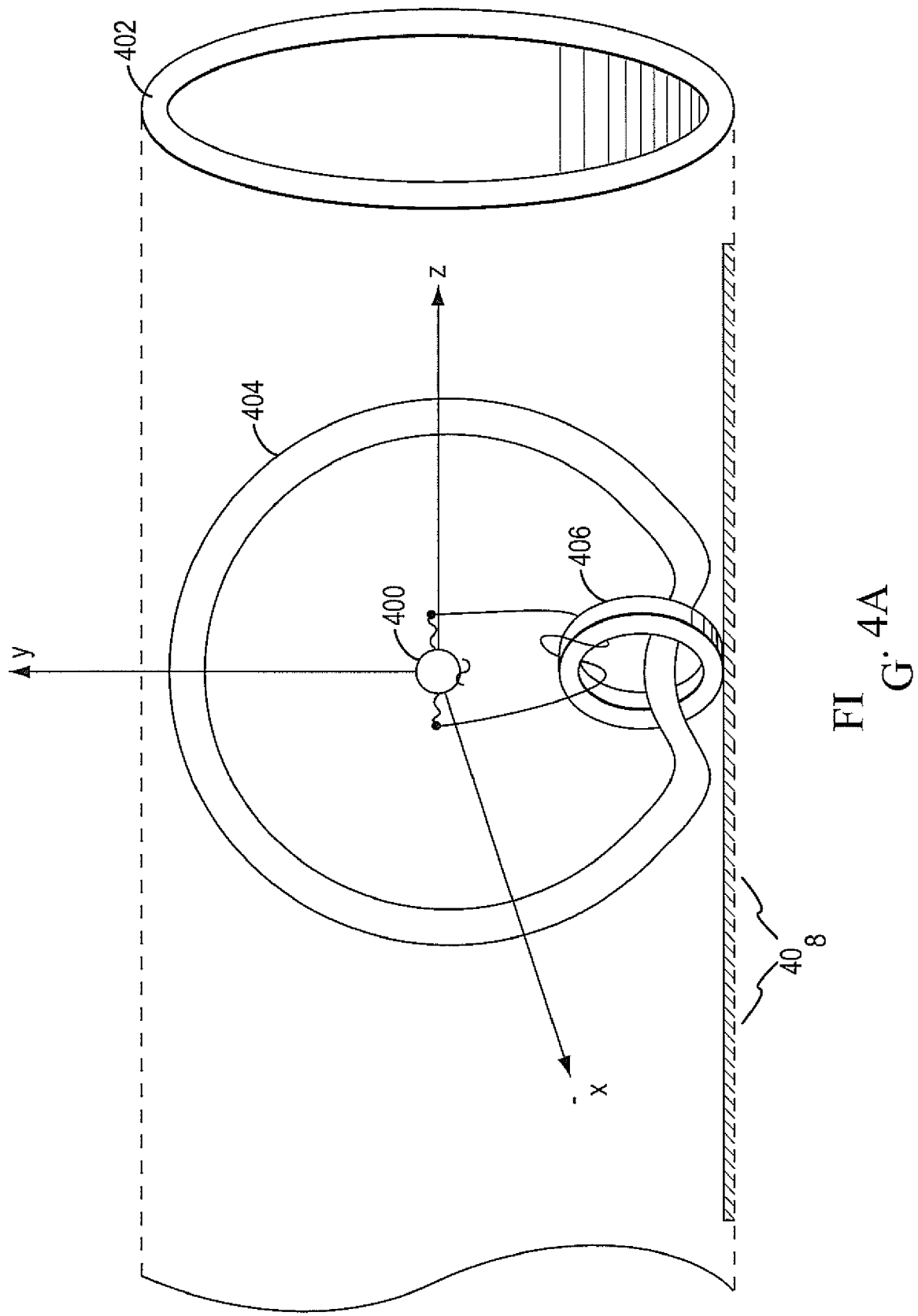
FIG. 4A illustrates another multi-axis sonde transmitter with embedded electronics and battery consistent with some embodiments of the present invention.

FIG. 4A illustrates another multi-axis sonde transmitter 400 with embedded electronics and battery consistent with some embodiments of the present invention. Particularly, sonde transmitter illustrated in FIG. 4A is designed to operate inside a metal enclosure such as, for example, a sonde housing. Particularly, sonde transmitter 400 may be configured to be an underground transmitter integrating a plurality of individual dipole transmitters, each of which may be configured to be orthogonal to the others. This design can operate inside a metal enclosure such as a sonde housing designed for horizontal direction drilling purposes and still radiate an AC-current induced magnetic field in desired direction(s). Only one transmitting axis is illustrated in FIG. 4A. It is noted, however, that the same or similar construction is possible at orthogonal placements within the same enclosure 402 to achieve a multi-axis transmitter. In some embodiments, at least two orthogonal transmit antennas are implemented to enable a ground based sonde locate receiver 100 to estimate all three sonde orientation angles (e.g., pitch, roll, and yaw). Particularly, if the sonde 400 is configured to transmit over two orthogonal antennas, neither one of the two transmitting antennas may need to be aligned with the cylindrical axis of the sonde 400. Further, in some embodiments, at least one of the dipole transmitters may be aligned with the cylindrical axis of sonde 400, which may allow for estimation of sonde 400 position and orientation during a drilling operation in which the sonde rotates. Roll angle may be estimated when sonde 400 is at rest using secondary dipole transmitters aligned at angles away from the cylindrical axis of the sonde.

Embodiments of the sonde embedded electronics 302 illustrated in FIG. 3B, may be utilized to induce a current in a secondary loop 404 illustrated in FIG. 4A, which in some embodiments may be constructed using a copper ring. Particularly, embedded electronics 302 included in sonde 400 may couple an induced current from a primary coil to the secondary loop via torroid 406 (e.g., a ferrite torroid), thereby inducing a current in secondary loop 404. In some embodiments, sonde 400 may operate with minimal losses attributed to the sonde housing 402 by utilizing a secondary loop 404 that has a lower resistance than the sonde housing 402. Further, in some embodiments, one or more slits 408 along the longitudinal axis of the sonde housing enclosure may be constructed to allow sufficient external emitted EM field strength by limiting the induced current in the pipe.

Figure 4B:
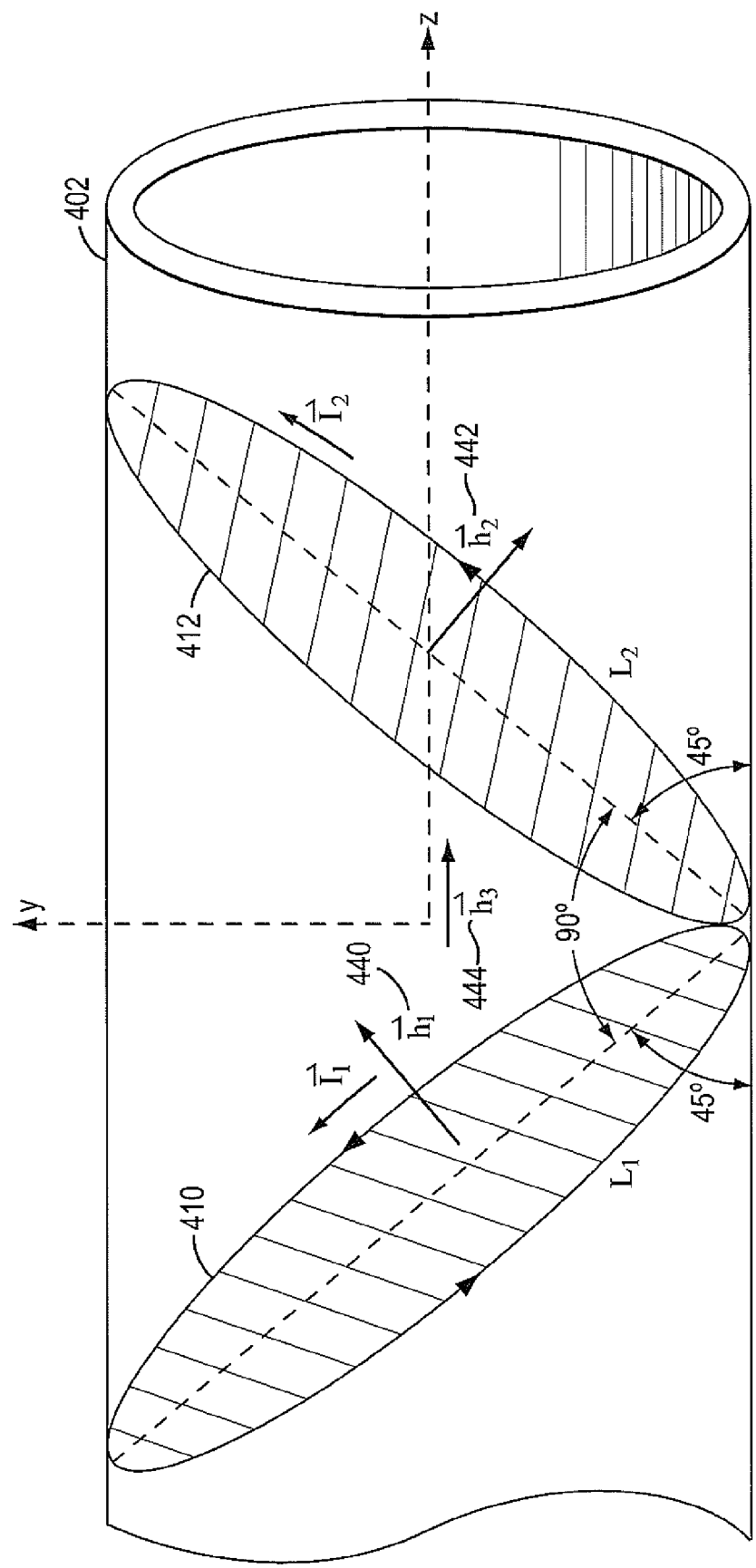
FIG. 4B illustrates an exemplary 2-axis sonde transmitter consistent with embodiments of the present invention.

FIG. 4B illustrates an exemplary 2-axis sonde transmitter 102 consistent with some embodiments of the present invention. Particularly, 2-axis sonde transmitter 102 includes dipole axis 410 and 412 orientated orthogonally with respect to each other and both at 45° to the cylindrical axis of the sonde. It is noted that this dipole axis 410-412 orientation can still be applied to Equations 1-9, as orientation angles are calculated with respect to the sonde locate receiver 100 and the 45° pitch that results from this transmitter design can be removed numerically. In some embodiments, dipole axes 410-412 may be driven utilizing signal select modulation, as described further below. For example, dipole axis 410 may be driven with signal select frequency F1, dipole axis 412 may be driven with frequency F2, and both dipole axes 410-412 elements may driven together with frequency F3. In some embodiments, all three frequencies can be active simultaneously, or to reduce power consumption of sonde 102, frequency F3 may only be active during active rotations of the drill rig.

Figure 4C:
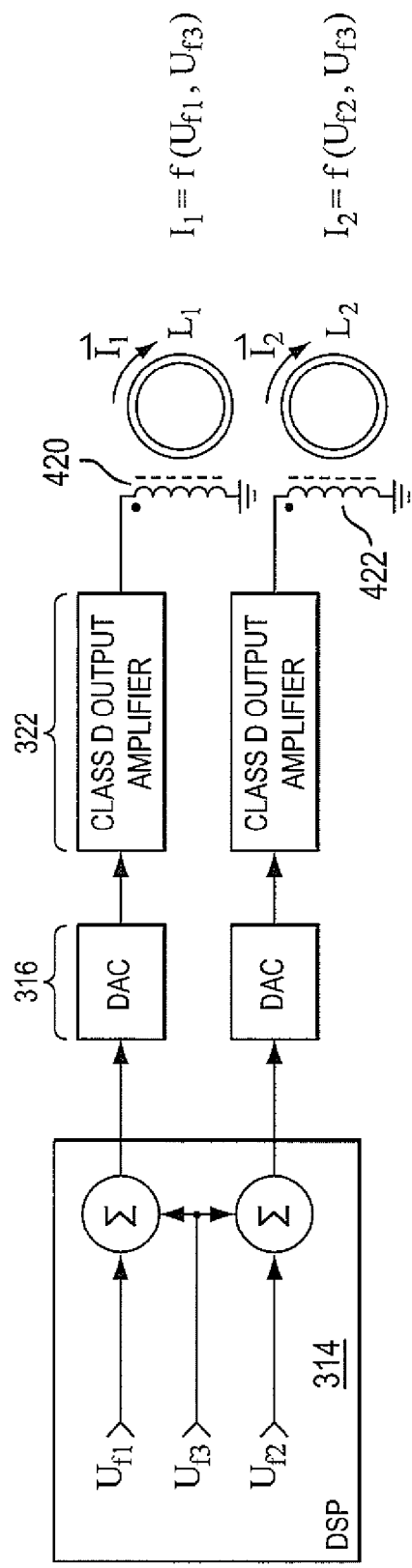
FIG. 4C illustrates a block diagram of an exemplary output stage included in embedded electronics of an exemplary sonde transmitter configured to drive a 2-axis sonde transmitter at three modulation frequencies consistent with some embodiments of the present invention.

FIG. 4C illustrates a block diagram of an exemplary output stage included in embedded electronics of an exemplary sonde transmitter configured to drive a 2-axis sonde transmitter at three modulation frequencies consistent with some embodiments of the present invention. Particularly, the output stage included in FIG. 4C may be utilized in embedded electronics 302 to drive two transmitter coils 420 $L_1$ and 422 $L_2$. As shown in FIG. 4C, the output channels driving coils $L_1$ and $L_2$ may include a DAC 316 and an output amplifier stage 322. DSP 314 may drive each output channels using signals which may be modulated according to one or more frequencies (e.g., f1, f2, and f3). Accordingly, the current provided to coils $L_1$ and $L_2$ by output current transformers 420 and 422 respectively may vary accordingly to the one or more driving frequencies (e.g., f1, f2, and f3).

Figure 4D:
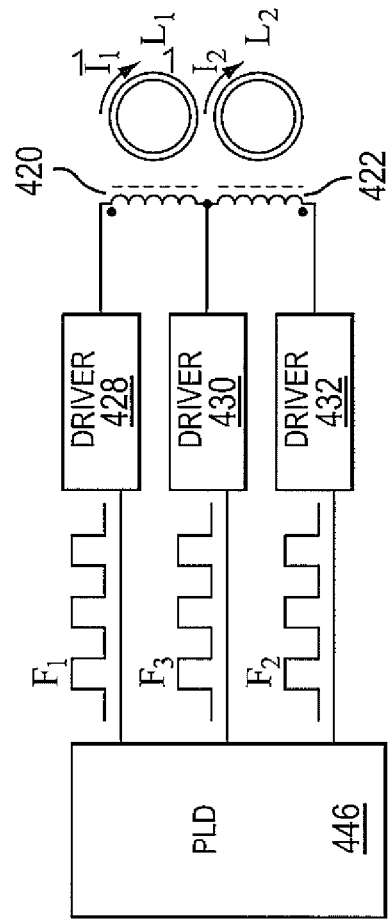
FIG. 4D illustrates a block diagram of an exemplary output stage included in embedded electronics of an exemplary sonde transmitter configured to utilize square waves to drive a 2-axis sonde transmitter consistent with some embodiments of the present invention.

FIG. 4D illustrates a block diagram of an exemplary output stage included in embedded electronics of an exemplary sonde transmitter configured to utilize square waves to drive a 2-axis sonde transmitter consistent with some embodiments of the present invention. In some embodiments, the embedded sonde output stage electronics illustrated in FIG. 4C may utilize square signal waves (e.g., F1, F2, and F3) to generate EM fields emanating from dipole transmitter coils $L_1$ 420 and $L_2$ 422 (e.g., h1 440, h2 442, and h3 444 illustrated in FIG. 4B). In some embodiments, the square signal waves may be generated by a programmable logic device (PLD) 446 included in embedded electronics 332. In some embodiments, this output stage design may minimize sonde 102 power consumption (e.g., increase sonde battery life).

Output current transformer 420, which may be driven by drivers 428 and 430, may mix square wave signals (e.g., F1 and F3) and induce current $I_1$ in transmitter coil $L_1$. Output current transformer 422, which may be driven by drivers 430 and 432, may mix square wave signals (e.g., F2 and F3) and induce current $I_2$ in transmitter coil $L_2$. In some embodiments, the induced output currents $I_1$ in coil $L_1$ and $I_2$ in coil $L_2$ may generate EM fields h1 440 and h2 442, respectively, as illustrated in FIG. 4B. Further, if currents $I_1$ and $I_2$ in coils $L_1$ and $L_2$ are based on a third driving frequency (e.g., F3), EM field h3 444 may be generated, representing the vector sum of EM fields h1 440 and h2 442, which in some embodiments may be aligned with the sonde longitude axis.

Figure 5A:
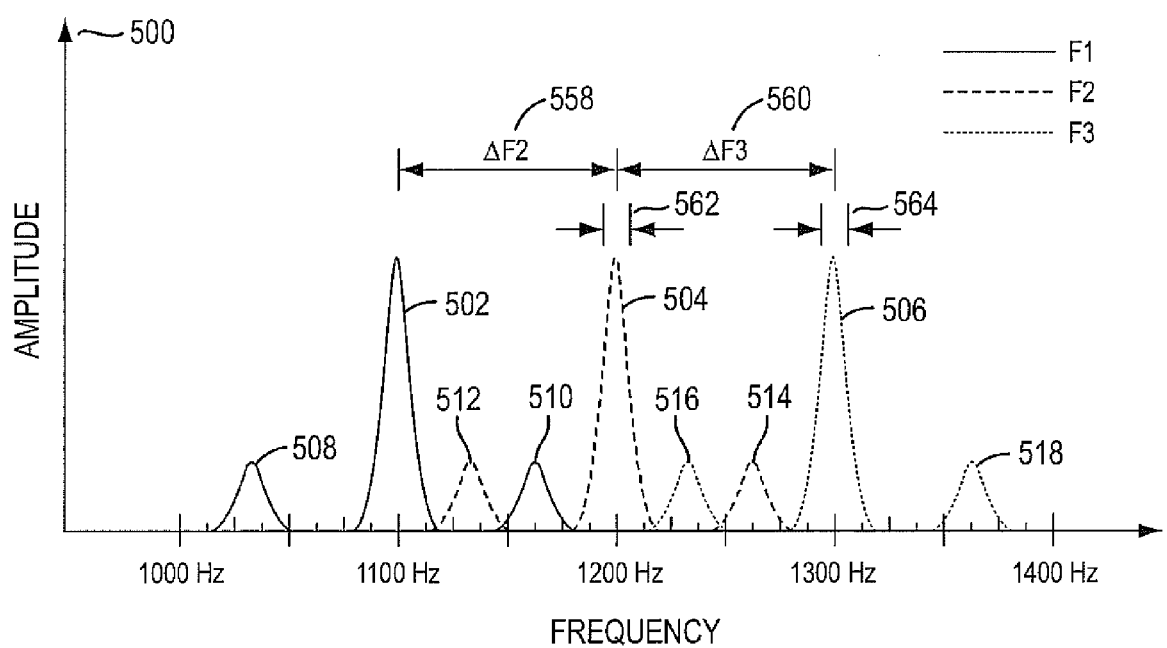
FIG. 5A illustrates a spectrum plot depicting the power spectra of three independent signal select modulated frequencies configured to provide phase reference information generated by an exemplary three-axis sonde transmitter, consistent with embodiments of the present invention.

FIG. 5A illustrates a spectrum plot 500 depicting the power spectra of three independent signal select modulated frequencies F1-F3 configured to provide phase reference information generated by an exemplary three-axis sonde transmitter 102. As discussed above, signal select modulation methods, as described in the '414 patent and further described in the '383 patent, may be implemented using DSP 314 included in sonde embedded electronics 302. While FIG. 5A illustrates the use of three unique signal select modulation frequencies F1-F3, the choice of signal select modulation frequencies may be completely independent and can span the full underground locating bandwidth of approximately 10 Hz to 480 kHz. In certain applications with increased interference, lower frequencies spaced reasonably closely may be utilized. For applications requiring increased sensitivity and depth performance, higher frequencies may be utilized, such as, for example, 83 kHz.

The exemplary spectrum plot shown for signal select modulation frequencies 502-506 506 occupies a lower range frequency set, and extends over a bandwidth approximately 1000 Hz to 1400 Hz, including what is necessary to illustrate the modulation frequency sidetones 508-512 for carrier frequency F1 502, 512-514 for carrier frequency F2 504, and 516-518 for carrier frequency F3 506. In some embodiments, carrier frequency F1 502 may represent the x-axis transmitter, carrier frequency F2 504 may represent the y-axis transmitter, and carrier frequency F3 506 may represent the z-axis transmitter.

As noted in the '414 patent, signal select modulation may utilize very narrow bandwidths for transmission of phase reference information, such that the effective bandwidth used for locating information can be on the order of about 1-3 Hz per tone. Accordingly, the combined signal select based transmitter-receiver system may sustain little additional noise compared to conventional receivers which traditionally have roughly the same detection bandwidths.

In some embodiments, for each sonde transmitter axis, measurements of the resulting EM field 104 can be made by a compatible receiver on the ground for specific frequencies as predefined per axis. Signal select demodulation may occur at the receiver for each carrier frequency. In some embodiments, signal select modulation frequencies may be selected so that the sidetones (e.g., 508-510 for carrier frequency F1 502) do no overlap with sidetones or carriers utilized for other transmit axes. Further, as previously discussed, the EM field sensor at the receiver can include three orthogonal EM detector coils 122. The signals received at EM detector coils 122 may be simultaneously processed to determine a measured EM field strength amplitude and phase information for one or more independent transmit directions.

Figure 5B:
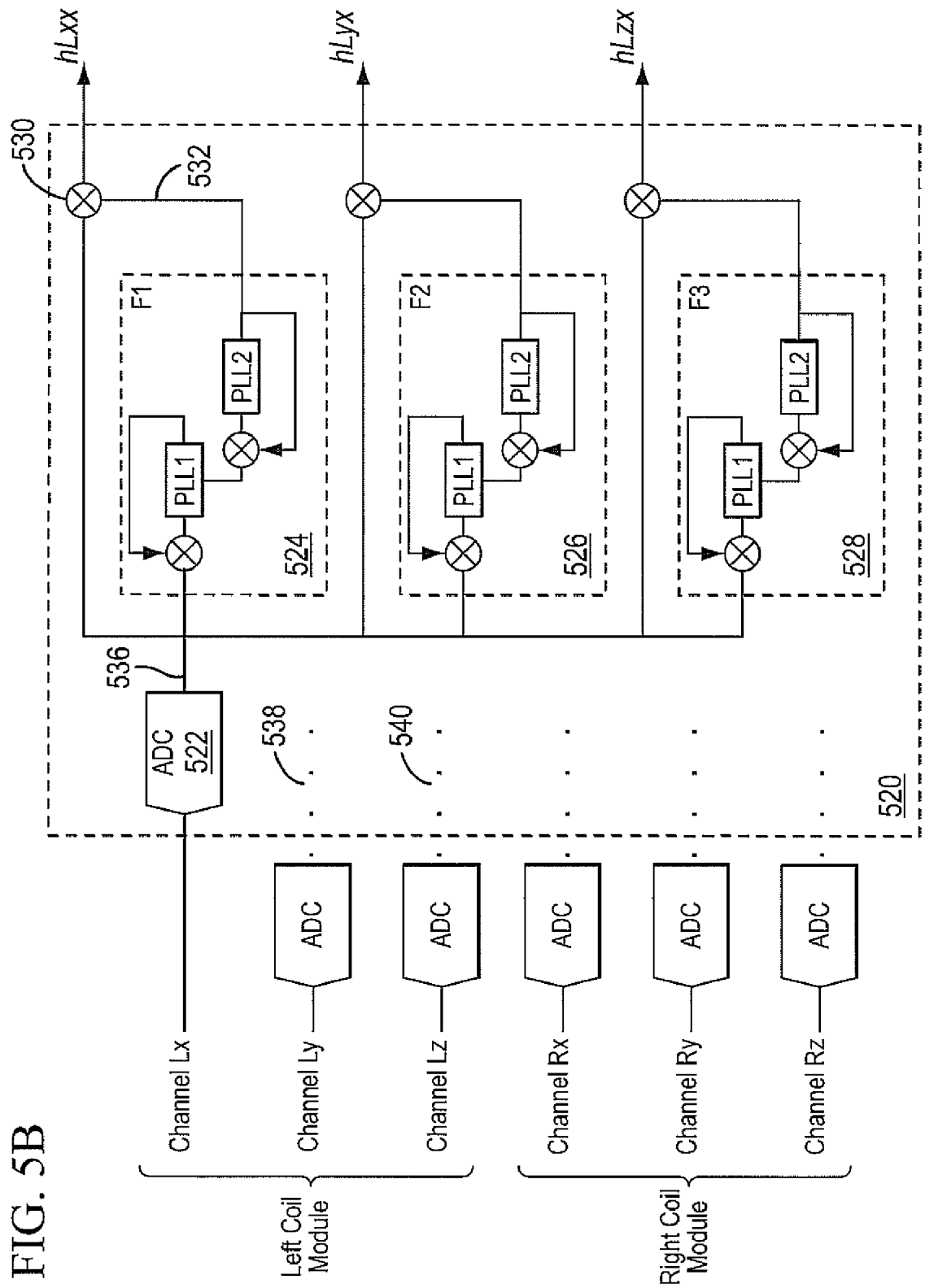
FIG. 5B illustrates a block diagram of an exemplary receiver channel that may be included in sonde locating receiver electronics configured to receive EM field strength amplitude and phase measurements from an EM detector coil and provide corresponding digital signals, consistent with some embodiments of the present invention.

FIG. 5B illustrates a block diagram of an exemplary receiver channel 520 included in sonde locating receiver electronics 126 configured to receive EM field strength amplitude and phase measurements from an EM detector coil 122 and provide a corresponding digital signal, consistent with some embodiments of the present invention. As discussed previously in reference to FIG. 1 and FIG. 2, a sonde locating receiver 100 may include a left and a right 3-D EM detector coil clusters 122, each cluster including three orthogonally oriented EM detector coils. Accordingly, in some embodiments, sonde locating receiver electronics 126 may receive six total measurement channels, one from each EM detector coil of the left and right 3-D EM detector coil clusters 122, which may be provided to analog input 202. FIG. 5B generally illustrates in more detailed an exemplary channel implementation included in analog input 202 for one input channel. Other input channels received by sonde locating receiver electronics 126 may be similar As illustrated in FIG. 5B, each input channel may include an analog-to-digital (ADC) converter 522 and a set of three nested phase-locked loop (PLL) blocks 524-528. In some embodiments nested PLL blocks 524-528 may form the basis of a signal select dual nested PLL block for each of three signal select modulation frequencies F1 502, F2, 504, and F3 506 illustrated in FIG. 5A, emanating from a 3-axis dipole sonde transmitter 102.

Input channels may include a demodulator 530 for each of the three dual nested PLL blocks 524-528. In some embodiments, demodulator 530 may include a multiplier and low-pass filter capable of multiplying the input signal by the detected phase reference signal 532. Accordingly, the demodulators 530 associated with the three dual nested PLL blocks 524-528 are capable of providing inphase and quadrature output signals computed for each transmit frequency (e.g., signal select modulation frequency), for each receiver coil cluster axis. Described as complex numbers composed of inphase and quadrature components, 18 field strength values may be computed for a system that includes three transmit axes and three receive axes located on both the left and right side of a sonde locating receiver 100. For example, complex measurement value $hL_{yx}$ 534 may represent the measured and demodulated complex field strength from the EM receive coil oriented in the x-axis plane of the left 3-D EM coil cluster 122 of sonde locating receiver 100 emitted from the transmission coil oriented in the y-axis place of the 3-D sonde transmitter. Stated alternatively, the 18 field values $hL_{xx}$, $hL_{xy}$, $hL_{xz}$, $hL_{yx}$, etc., can represent both the magnitude and phase of the magnetic field strength of the selected transmitter axis at a particular receiver coil axis on the left side. Similar designations may be used for the field values received at the receiver coil axes in right side 3-D receiver coil cluster 122 (e.g. $hR_{xy}$).

Figure 5C:
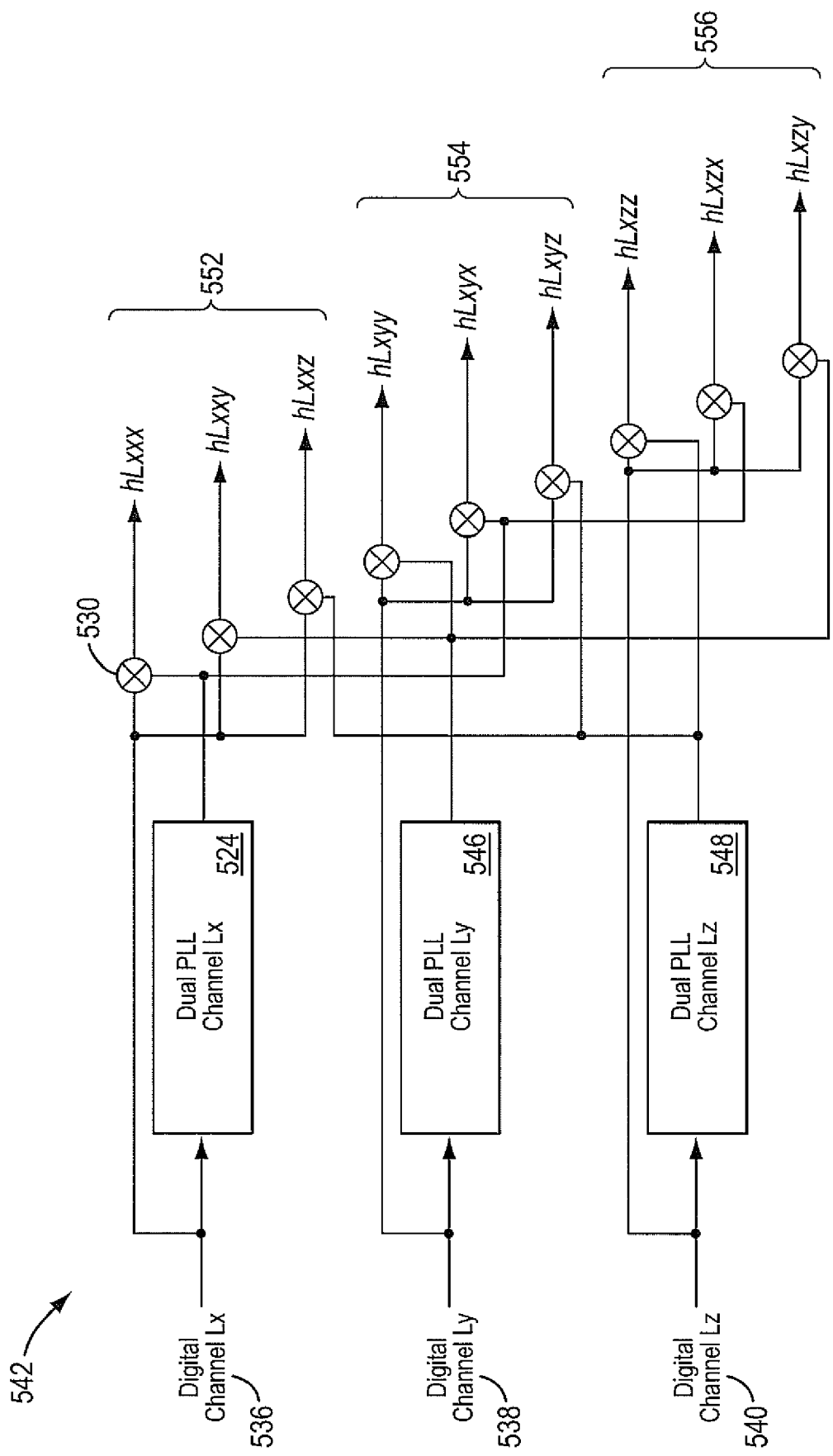
FIG. 5C illustrates a block diagram of another exemplary receiver design that may be include in sonde locating receiver electronics consistent with some embodiments of the present invention.

FIG. 5C illustrates a block diagram of another exemplary receiver design (e.g., a demodulator matrix) that may be included in sonde locating receiver electronics consistent with some embodiments of the present invention. Particularly, demodulator matrix 542 illustrated in FIG. 5C may be implemented in conjunction with the receiver channel ADC signal 536 illustrated in FIG. 5B to allow for more accurate received sonde signal demodulation. The exemplary receiver channel 520 illustrated in FIG. 5B requires that the magnitude of the digital converted input signal 536 be sufficiently large in order to accurately measure an individual channel phase reference signal 532. If the magnitude of input signal 536 is too low, the nested PLLs 524-528 may not phase lock and any measured phase reference 532 may be inaccurate.

Exemplary demodulator matrix 542 mitigates the above-described limitations of single demodulator 530. To ensure that all measured signal data 552-556 out of demodulators 550 is based on a strong PLL lock, an alternative channel may be selected to serve as a phase reference signal. Using demodulator matrix 542, for a selected transmitter axis, such as the x-axis transmitter with signal select carrier frequency F1 502, digital converted input signals 536, 538, or 540 from one of the three receiver channels (e.g., one the receive channels associated with one of the EM coils included in EM coil cluster 122) may have sufficient magnitude such that the demodulated phase reference signal for that channel can serve as the PLL lock signal for all channels in the same coil cluster at the same carrier frequency (e.g., EM signals emitted from the same transmitter axis).

In some embodiments, once the relative magnitudes of converted input signals 536, 538, or 540 is determined, the output of the set of three signals comprising output 552 or the like having the most stable phase reference may be determined. As shown in FIG. 5C, output signals may be denoted according to the respective receiver and/or transmitter axes associated with the channel. In this manner, the last subscript in the signal $hL_{xxy}$, et al, may be utilized to denote the axis of the receiver used as the phase lock channel. A similar selection decision based on magnitude comparison may be performed for the other sets of three output signals 554 and/or 556. In this manner, the sonde locating receiver 100 measurement process may provide a set of 18 complex field strengths, each of which may be based on a stable phase reference.

The signal processing embodied in the exemplary receiver designs illustrated in FIGS. 5B and 5C may, in some embodiments, be implemented using DSP 206. Further, this signal processing may be utilize software-based implementations. In some embodiments, other implementations of the signal processing disclosed herein may be utilized (e.g., via programmable hardware architectures).

Figure 6:
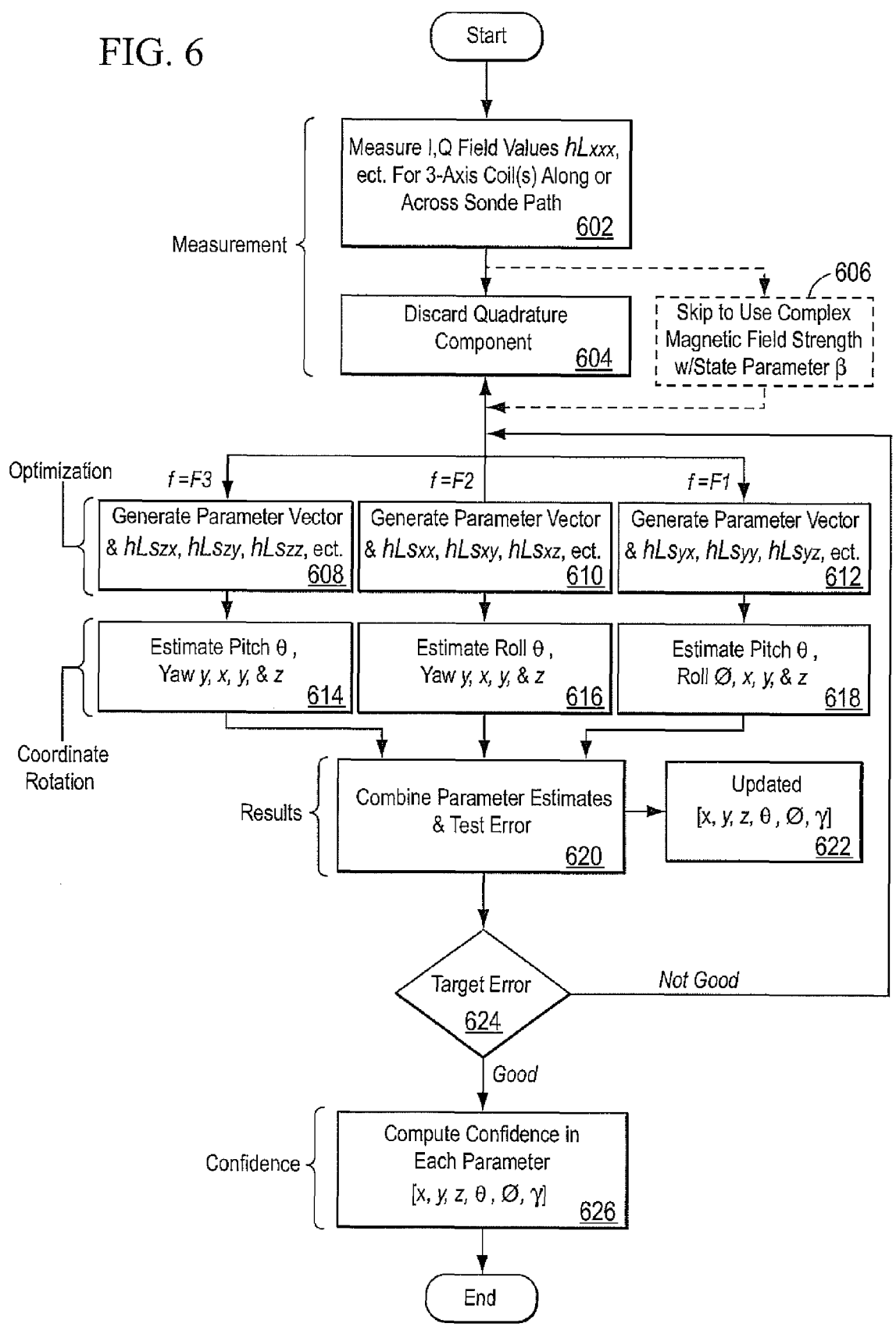
FIG. 6 illustrates a process flow for a sonde locating receiver consistent with some embodiments of the present invention.

FIG. 6 illustrates a process flow for a sonde locating receiver 100 consistent with some embodiments of the present invention. Following initialization of the process, the measurement and demodulation process described above with respect to FIGS. 2 and 5A-5C may be performed at step 602. Assuming minimal interference and/or distortion of the emitted EM field 104, the amplitude and shape of EM field 104 and the modeled field used in optimization may be independent of signal frequency. When interference and/or distortion of the emitted EM field 104 are small, the quadrature component of the signals $hL_{xxy}$, et al, can be discarded at step 604, leaving the signed inphase component of the measured signals. In some embodiments, the phase of the measured signals may be either 0° or ±180° and, therefore, can be used to indicate the EM signal direction. In such circumstances, instead of utilizing a full set of 18 complex values per modeled point in space, a simpler description of the system may be utilized that substitutes a set of 18 signed values.

If interference and/or distortion are present in the emitted EM field 104, however, the process may proceed to step 606. In such situations, a 7th sonde location/orientation parameter β, representing an overall phase rotation of the received signals, can be added to the optimization parameter vector $\vec{a}$, such that $\vec{a}=[x,y\,z,\theta,\phi,\gamma,\beta]$. In such embodiments, the measured signal select phase at the receiver may be utilized as a sensitive indicator of inductive and capacitive coupling effects, and the relative impact of such distortion on the measurement can be reflected in the magnitude of β, as is further described in the '383 patent. In the context of the description of the process illustrated in FIG. 6 provided below, however, it is assumed that little to no interference and/or distortion are present in the emitted EM field 104, and that the process thus proceeds through step 604.

As discussed above, Equations 1-9 may be utilized to represent the ideal models of the expected EM field at the sonde locate receiver 100 as a function of the position of receiver 100 in the EM field 104 generated by sonde transmitter 102. Utilizing these equations, a set of expected EM field models may be generated for one or more estimated sonde positions. During an optimization process, sonde orientation parameters (e.g., θ, φ, γ) may be presumed to converge to their actual values, allowing the measured EM field 104 to be rotated by the negated orientation angles and thus conform to Equations 1-9. In generating model values for a hypothetical EM field at position of 3-D EM coil clusters 122 on both the left and right sides of the cart-based sonde locate receiver 100, a subscript L or R as well as a designator s to denote modeled values as opposed to measured values may be utilized. Accordingly, a hypothetical EM field generated by a transmitter coil oriented coincident with the y-axis plane at the sonde modeled at the location of an EM coil on the left EM coil cluster 122 oriented coincident with the x-axis plane may be denoted by $hLs_{yx}$. A set of model parameter values and as well as measured parameter values including [x, y, z, θ, φ, γ] may be generated during the optimization process, represented by steps 608-612, for each EM coil of a 3-D EM coil cluster 122 (e.g., a 3-D EM coil cluster for one side of a cart-based locate receiver having left and right 3-D EM coil clusters) respectively, with an assumption that sonde orientation parameters (e.g., θ, φ, γ) have zero values.

Once a set of expected EM field models has been generated and actual EM field 104 measurements have been taken, the optimization process described in steps 608-612 may proceed to determine a best fit expected EM field model to the measured EM field 104, and the corresponding estimated sonde location associated with the selected best fit expected EM field model may be attributed with the location of the sonde 102. In the preceding discussion, a sonde locating receiver capable of computing 18 complex values per measurement point and a modeling process that can generate the expected 18 field values from a set of parameters a have been described.

A nonlinear least squares optimization method may be utilized to determine a best fit expected EM field model to the measured EM field 104, which in some embodiments may be the Levenberg-Marquardt optimization method.

The above-described optimization method is similar to the optimization method described in the '383 patent in the context of a line-based "walkover locate" algorithm capable of utilizing a bleedover decoupling processing system to generate more accurate estimates of centerline, depth, and current of an underground utility line. In the '383 patent, the modeled EM field geometries represent cylindrical field strength distribution generated by a long continuous conductor. The walkover locate process described in the '383 patent may include repeated quadrature measurements of an EM field as a function of a transect distance (e.g., as the receiver moves transversely) above a target cable such as target line. Measured EM field data may be fit to an ideal EM model using a numerical optimization approach, and from the model the cable centerline, depth, and current estimates may be obtained.

In accordance with some embodiments, the optimization techniques described in the '383 patent may be adapted for a sonde-based walkover locate. For sonde location determination and optimization, the parameter set a may differ from those utilized in the '383 patent and the model EM field Equations 1-9 may be adapted to describe a dipole EM field distribution. Furthermore, signal processing modules included in receiver electronics 126 may be similar to those disclosed in the '383 patent in the context of a sonde locate receiver, including the "nested" dual digital PLLs 524-528 et al. utilized to demodulate amplitude and phase measurements of the measured EM field 104 illustrated in FIG. 5B.

Following model optimization (e.g., steps 608-612), the determined best fit estimated sonde location parameters may be rotated and translated to a georeferenced coordinate frame from a cart based measurement coordinate frame at steps 614-618. This coordinate rotation may be performed based on measured sonde orientation parameters associated with the measured EM field 104 as well as the estimated sonde orientation parameters associated with a sonde EM field orientation best fit model determined using a similar optimization process. Sonde location and orientation parameter estimates determined using the aforementioned optimization methods may be combined (step 616) and utilized to generate an updated sonde parameter vector (step 622) describing an estimated position and orientation of target sonde 102. Differences between the best fit model EM field parameters and the measured EM field 104 parameters may be associated with an error value, which may be compared against a target error value at step 624. If the error is within acceptable ranges, the process may proceed. However, if the error is outside acceptable ranges, the sonde position and orientation optimization processes (i.e., steps 608-618) may be repeated until the measured error is acceptable. Finally, the measurement error may be utilized at step 626 to provide confidence information related to measurement accuracy of one or more of estimated sonde position and orientation parameters $[x, y, z, \theta, \phi, \gamma]$.

An operator of sonde locate receiver 100 may perform a "walkover locate" over target sonde 102 at any angle with respect to the sonde's cylindrical axis for any distance. In some embodiments, the above-described model fitting optimization process may provide estimated sonde position and orientation information regardless of whether the walkover path of the sonde locate receiver 100 is transverse (e.g., across the desired sonde path), along the sonde path, or parallel to any oblique angle in between. As discussed above and illustrated in FIG. 1, the geometrical description of the system may describe EM receiver coil 122 axes (x,y,z) as coincident with the sonde 102 (x,y,z) axes. In some embodiments, deviations of the walkover path of the sonde locate receiver 100 from an orthogonal transect or a path having a direction substantially parallel to the target sonde cylindrical axis may be characterized as yaw angle ($\gamma$) deviations.

For the general case of a 3-D EM coil transmitter wherein each dimension is configured to transmitted a signal select modulated signal at a unique carrier frequency, and a single 3-D EM coil receiver 122 (e.g., left side or right side 3-D EM coil receiver of the sonde locating system 100, thus L or R designator of the field values may be dropped), the above described exemplary process flow for deriving estimates of target sonde 102 spatial position and orientation from a set of nine successive field measurements (e.g., three each at each frequency) may be summarized in the five steps described below:

Step 1 Measurement (602-604): Collect the following sets of quadrature measurements (e.g., I, Q components at each measurement distance increment) relative to the demodulated phase reference (i.e., step 602):

a. $[h_{xx}\ h_{xy}\ h_{xz}]$—3-D field measurements at the sonde locate receiver 100 on the ground from the x-direction transmit coil of sonde 102;

b. $[h_{yx}\ h_{yy}\ h_{yz}]$—3-D field measurements at the sonde locate receiver 100 on the ground from the y-direction transmit coil of sonde 102;

c. $[h_{zx}\ h_{zy}\ h_{zz}]$—3-D field measurements at the sonde locate receiver 100 on the ground from the z-direction transmit coil of sonde 102; and d. Discard the quadrature components of the field values (step 604). The resulting in-phase component may be described as a signed version of the measured EM field 104 strength.

Step 2 Optimization (608-612): Using the signed in-phase component of the field strength, the non-linear optimization process may be performed to estimate a parameter vector $[x, y, z, \theta, \phi, \gamma]$ three separate times for each measurement axis in sequence using:

a. $\mathrm{Re}[h_{xx}\ h_{xy}\ h_{xz}]$ demodulated from frequency $F_1$;

b. $\mathrm{Re}[h_{yx}\ h_{yy}\ h_{yz}]$ demodulated from frequency $F_2$; and c. $\mathrm{Re}[h_{zx}\ h_{zy}\ h_{zz}]$ demodulated from frequency $F_3$.

Step 3 Coordinate Rotation (614-618): Utilizing each of the parameter sets $[x, y, z, \theta, \phi, \gamma]$ resulting from the optimization in steps a, b, and c of Step 2:

a. Compute the model-based estimated field (e.g., compute the model-based field from each of the three parameter sets), calculating field values $hs_{xx}$, $hs_{xy}$, $hs_{xz}$, $hs_{yx}$, $hs_{yy}$, $hs_{yz}$, $hs_{zx}$, $hs_{zy}$, and $hs_{zz}$;

b. Rotate the measurement field values $\mathrm{Re}[h_{xx}\ h_{xy}\ h_{xz}]$, $\mathrm{Re}[h_{yx}\ h_{yy}\ h_{yz}]$, and $\mathrm{Re}[h_{zx}\ h_{zy}\ h_{zz}]$ by negated versions of optimized pitch, roll, and yaw angles ($\theta, \phi, \gamma$);

c. Form an error matrix by subtracting the rotated and measured field values from the model values (e.g., for the entire walkover);

d. Repeat Step 2 and Step 3 until the error converges to less than a defined threshold;

e. For each iteration, compare the measured field to the adapted model field equation set which assume no pitch, roll, or yaw; and f. Over the course of the orientation optimization, pitch, roll, and yaw angles ($\theta, \phi, \gamma$) converge to their expect values as the error in the computer field is minimized compared to the measured field.

Step 4 Results (620-622): Two estimates of each orientation parameter (θ, φ, γ) may be acquired from the following three optimization steps:
 a. roll φ and yaw γ from Step 2a;
 b. pitch θ and roll φ from Step 2b; and
 c. pitch θ and yaw γ from Step 2c.
The two estimates of orientation angles (θ,φ,γ) may be averaged together. The position of the sonde (e.g., in reference to the x, y, z coordinate frame) may be averaged from the three step optimization results, the inputs of which may depend on the predominant direction of the walkover (e.g., transverse or alongside the sonde) and, in some embodiments, utilize only two of the three transmitted EM field axes.

Step 5 Confidence (626): The error in the final estimated target sonde 102 location and orientation parameter set may be estimated based on a comparison between the best fit model target sonde EM field and the measured EM field 104 data. From this comparison, the difference between the best fit model EM field and the measured EM field data may be used to generate confidence information related to the accuracy of the estimated EM field parameters. In some embodiments, this confidence information may be represented as a 1σ or 2σ confidence vector for the parameter set utilizing the methods described in U.S. Pat. No. 7,356,421 by Thorkell Gudmundsson, Johan D. Överby, Stevan Polak, James W. Waite, and Niklas Lindstrom (the '421 patent), which is assigned to Metrotech Corporation and herein incorporated by reference in its entirety.

Similar steps may be utilized for both the sonde locate receiver's 100 left and right 3-D EM detector coil clusters 122. In some embodiments, however, a single 3-D coil cluster 122 may be utilized in the above-describe process to identify the position and orientation of a target sonde 102. Such embodiments may utilize at least a two axis sonde EM field transmitter. In some embodiments, two 3-D receiver coil clusters 102 may be utilized to determine sonde 102 position information and pitch and roll measurements may be obtained locally at sonde 102 through conventional methods.

In some embodiments, if only the magnitudes of the measured field values $\text{Re}[h_{xx}\ h_{xy}\ h_{xz}]$, $\text{Re}[h_{yx}\ h_{yy}\ h_{yz}]$, and $\text{Re}[h_{zx}\ h_{zy}\ h_{zz}]$ are utilized in the above-described optimization process (as opposed to the signed inphase components), a unique parameter vector solution may not exist, even when two receiver coil clusters are used. In such circumstances, absent a phase reference as is provided by the signal select method, sign changes that occur in the field may not be unambiguously detected. Accordingly, including phase measurements in the optimization process may allow for more accurate sonde position parameter estimation.

In some environments, a radiating target sonde 102 can induce an interference signal into other conductive media and objects. Eddy currents are one example of this undesirable coupling effect. Further, the target sonde 102 EM signal can in some circumstances re-radiate from any metallic object underground including utility lines that are in the vicinity of the radiating sonde 102 (e.g., signal bleedover). These signals, being in exactly the same frequency band as the transmitted sonde locating signal, can destructively cause interference at the point of receiver measurement on the ground.

Embodiments of the invention may include a signal processing structure for refining models to account for the phase transfer function occurring between sonde transmitter 102 and locator 100 attributed to these interference effects, as are generally described in the '421 patent. Confidence bounds for both the target sonde 102 centerline and depth estimates can be similarly determined based on errors that result from the model optimization process due to interference and distortion (e.g., based on the differences between the best fit EM field model and the measured EM field 104). By accounting for the presence of an arbitrarily complex EM field due to distortion, the methods described above help to ensure that estimated EM field parameters are more accurate over an entire walkthrough and help to minimize measurement error caused by field distortions.

Further embodiments of the present invention may integrate methods described in U.S. patent application Ser. No. 12/209,999, by Kun Li, et al., which is assigned to Metrotech Corporation and herein incorporated by reference in its entirety, to utilize an enhanced EM field model that includes a phase measurement error term to precisely locate an underground object. In some embodiments, the phase error term can be modeled as a function of location (e.g., reference to an x, y, z coordinate frame) and phase from each of the three demodulated EM receiver coils included in an 3-D EM receiver coil 122, with the result that the model estimation of the parameter set $\vec{a}$ is less biased by bleedover coupling.

Figure 7A:
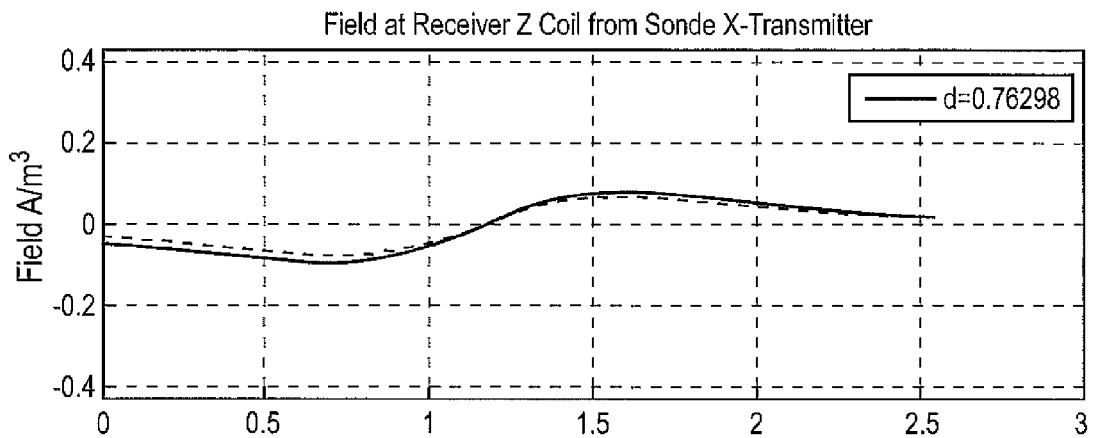
FIG. 7A illustrates an exemplary measured and modeled EM field at the x-axis receiver coil of a 3-axis EM receiver coil cluster generated by a sonde having a transmitter oriented coincident to the x-axis coordinate plane.
Figure 7B:
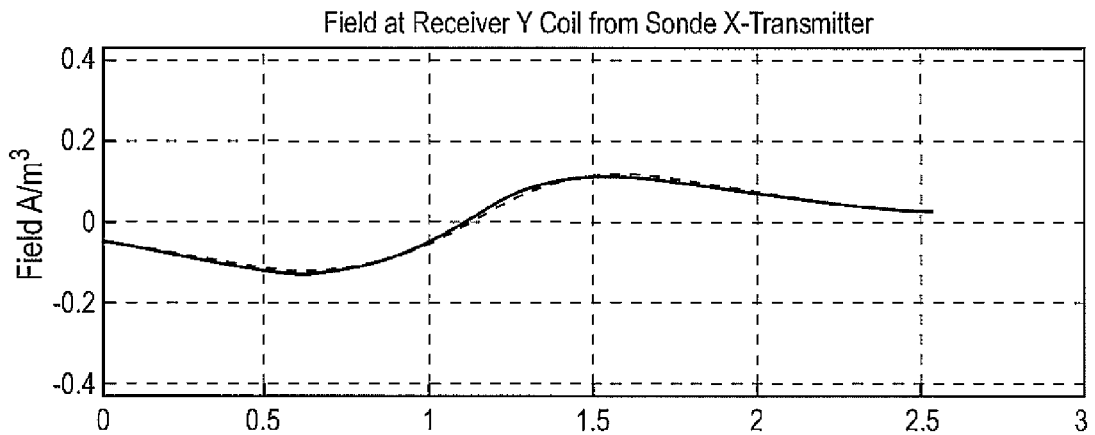
FIG. 7B illustrates an exemplary measured and modeled EM field at the y-axis receiver coil of a 3-axis EM receiver coil cluster generated by a sonde having a transmitter oriented coincident to the x-axis coordinate plane.
Figure 7C:
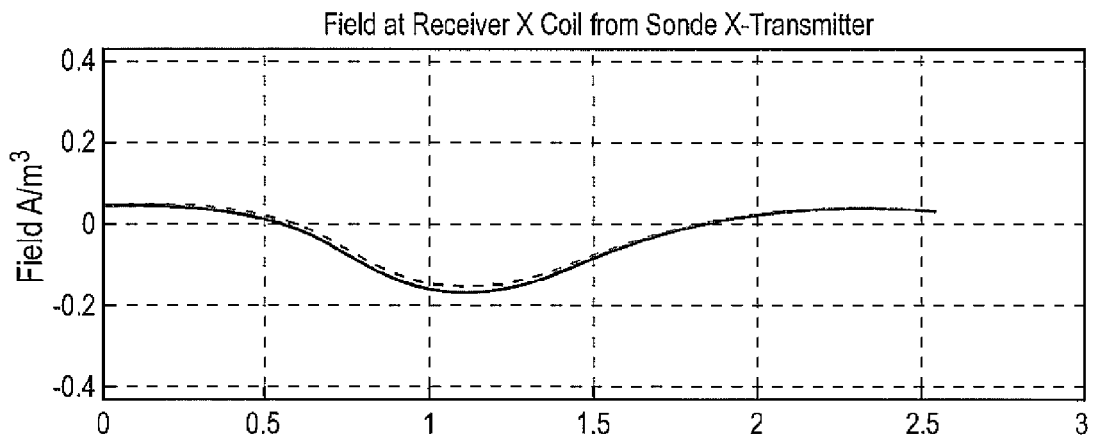
FIG. 7C illustrates an exemplary measured and modeled EM field at the z-axis receiver coil of a 3-axis EM receiver coil cluster generated by a sonde having a transmitter oriented coincident to the x-axis coordinate plane.

FIGS. 7A-7C illustrates exemplary measured and modeled EM fields at the x-axis, y-axis, and z-axis receiver coils respectively of a 3-axis EM receiver coil cluster generated by a sonde having a transmitter oriented coincident to the x-axis coordinate plane. Particularly, the measurement information presented in FIGS. 7A-7C illustrate an exemplary measurement set taken during a locate receiver 100 walkover across the path of the sonde. The measured EM field 104 is depicted as a solid line and the optimized best fit model EM field is depicted as a dashed line. Six other sets of measured and optimized EM field vectors representing measured y and z axes transmit outputs may be generated which exhibit similar behavior.

Using the process described above in detail in reference to FIG. 6, nine measurement vectors may be used to estimate the optimized sonde location parameters. In the context of the measured sonde illustrated in FIGS. 7A-7C, the following information can be obtained:
 The sonde is at depth 76 cm;
 The walkover transect crossed the z-axis at 45 cm at 1.09 meters into the walkover;
 The 1σ position error (depth, centerline, and offset) are 1 cm each; and
 The estimated pitch, roll, and yaw angles of the sonde are 1.0°, 3.6°, and 7.2° respectively, each with a 1σ error of less than 0.3°.

In some embodiments, the measurement accuracy requirement on sonde pitch may be more stringent than the measurement accuracy for sonde pitch due to certain utility installations (e.g., water, sewer, to maintain correct drainage or pressure), with close tolerances on the slope of the bored path. In some installations, the target precision for the filtered pitch value may be on the order of 0.1°. In some embodiments, a reduction in the 1σ error bound of the pitch estimate is possible by including more measurement points in the optimization. By lengthening the walkover distance and/or slowing the walkover speed so that more points are collected per unit time, larger position measurement diversity can be attained. Furthermore, increasing the number of measurements can improve the ability of the locate receiver 100 to estimate the shape of the target sonde EM field 104, thereby lowering the error bound of a pitch estimate. In some embodiments, in-place averaging (e.g., when the cart is stationary) may be utilized to reduce noise in the field measurements. That being said, the optimization process may be most accurate when field measurements are collected across a wider walkover transect within the measurable field over a high density of measurement points Sonde Tracking Sonde location and orientation estimation, as described above, may typically be performed when the sonde is at rest (e.g., while another segment is added to the drill string 108 of an underground boring machine). The walkover process and subsequent optimization pinpoint may be used to precisely estimate location of sonde 102 and its orientation. As previously discussed, embodiments of the present invention allow for measurement of target sonde 102 position and orientation with no prerequisite knowledge of the geometrical relationship between the receiver 100 and sonde dipole transmitter 102 if the EM field 104 emanating from sonde 104 is detectable and if the signal select phase reference can still be demodulated from the measured field strengths. Utilizing the walkover optimization process, the position and orientation of sonde 102 at any point can be accurately estimated and placed in an Earth-based coordinate frame.

Sonde tracking may be distinguished from sonde locating in that the precise sonde position may be previously estimated using the sonde location method while the sonde is stationary. As directional drilling resumes, target sonde 102 may move to a new position, ideally along a planned path. Utilizing sonde locating receiver 100, steering information may be provided to a drill controller 136 operator so that the targeted sonde 102 position can be controlled to within acceptable tolerances.

Figure 8A:
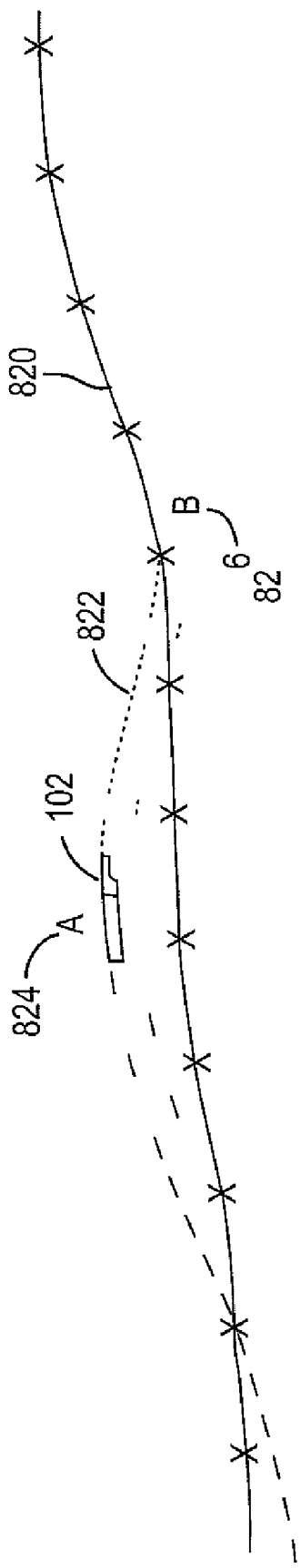
FIG. 8A illustrates the use of a sonde locating receiver in steering a sonde consistent with some embodiments of the present invention.

FIG. 8A illustrates the use of a sonde locating receiver 100 in steering sonde 102 consistent with some embodiments of the present invention. Particular, the FIG. 8A illustrates sonde steering from a two-dimensional perspective. In some situations, an operator may wish to steer target sonde 102 along a predefined drill path plan 820. In some embodiments, a discrete representation of the place can be established on a 3-D map included in, for example, a GIS mapping platform, that may utilize any designated coordinate system. In some embodiments, the predefined drill path plan 820 may be downloaded to receiver 100 prior to commencing a drilling operation.

In some embodiments, when the actual path of the drill (e.g., the estimated path of the sonde) does not follow the planned path 820, a corrective drill path plan 822 may be required to bring the drill head (e.g., sonde 102) back into alignment with predefined drill path plan 820. As illustrated in FIG. 8A, sonde 102 (e.g., drill head) may have a known estimated position at point A 824 as a result of a precise walkover optimization operation, as described above. Sonde receiver 100, may calculate a corrective drill path plan 822 to bring sonde 102 back into alignment with predefined drill path plan 820 at point B 826. In some embodiments, this calculated corrective drill path plan 822 may be conditioned on known limits on total curvature of the drill string and/or heading change limitations of the drill head. Corrective drill path 822 may be presented to the drill rig operator on console 220 as a corrective target path. While illustrated as a 2-D vector in FIG. 8A, corrective path 822 may be a 3-D vector calculated to provide a corrective path between two points in 3-D space.

In some embodiments, if corrective path 822 has been calculated, Equations 1-9 may be utilized to calculate expected magnetic field strengths to be observed by sonde receiver 100 at a known fixed position at each increment in sonde 102 position over corrective path 822 using the state estimates for the known sonde orientation angles to rotate the expected fields to align with the cart locator 100 local coordinate frame. 18 complex values (or 9 values if one 3-D receiver cluster 122 is utilized) generated by such calculations based on incremental sonde positions over corrective path 822 may be formed at each increment in position to generate a set of target models for the sonde's position as it moves between position A 824 to rejoin the desired drill path at 826.

Figure 8B:
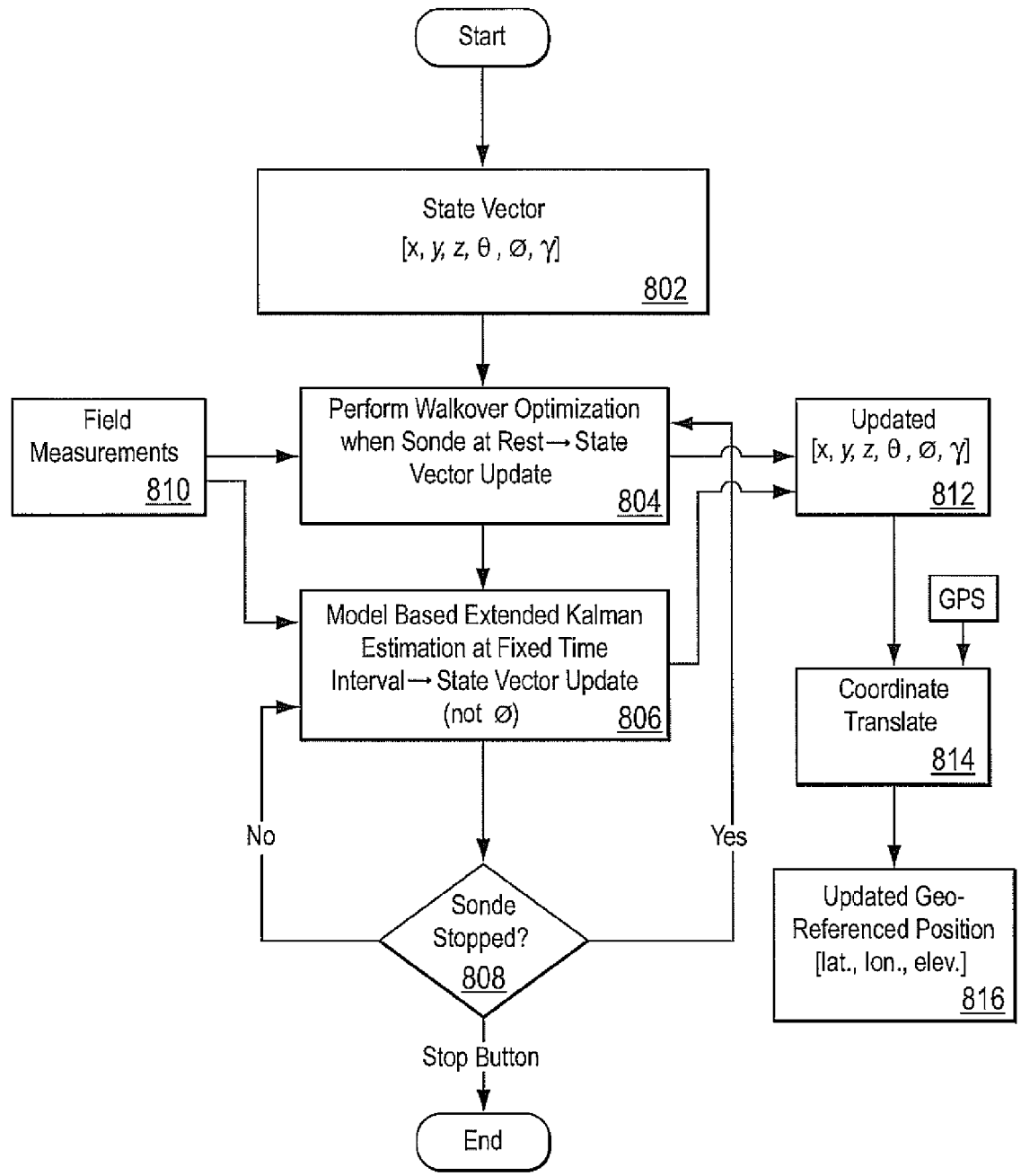
FIG. 8B illustrates a process flow of a sonde locator for performing real-time georeferenced tracking of the sonde while in motion, consistent with some embodiments of the present invention.

FIG. 8B illustrates the use of a sonde locator for performing real-time georeferenced tracking of the sonde while in motion, consistent with some embodiments of the present invention. In some embodiments, the process illustrated in FIG. 8B may employ an Extended Kalman tracking filter 806 to maintain georeferenced estimates of sonde 102 position as it moves along intended path 820. Particularly, an iterative Kalman process may be utilized to estimate incremental movement of the sonde from an established position.

The Kalman method may be used to iteratively update estimates of physical parameters derived from sensor measurements by comparing those estimates to a reference parameter set derived from an a priori dynamic model. The Extended Kalman filter may be used for non-linear processes (e.g., processes from which sensor measurements are not linearly related to changes in the underlying model parameters). See e.g., *Kalman Filteng, 2$^{nd}$ edition*, Grewal and Andrews, Wiley, 2001 ("Grewal").

In sonde tracking, changes in sonde 102 position parameters (e.g., x, y, and z) as applied to EM field model Equations 1-9 may not result in linear changes in measured field strength h. In some embodiments, however, it may be possible to use a linear approximation of the change in field strength h with respect to changes in position, if the incremental position change between approximations is small, by modeling the effects of small perturbations in the state of the non-linear system from a nominal value.

In the context of sonde tracking, corrective drill path 822 may be viewed as a nominal trajectory from which state vector changes can be viewed as approximately linear perturbations. In some embodiments, this estimation process may be summarized in the four steps described below:

Step 1 (steps 802 in FIG. 8B): State vector X and process noise vector V may be defined as follows:

$$X_k = \begin{bmatrix} x(k) \\ y(k) \\ z(k) \\ \theta(k) \\ \gamma(k) \end{bmatrix}, \quad V_k = \begin{bmatrix} v_x(k) \\ v_y(k) \\ v_z(k) \\ v_\theta(k) \\ v_\gamma(k) \end{bmatrix}. \quad \text{(Equation 10)}$$

wherein, x(k), y(k), z(k) denote the known receiver position in the sonde 102 coordinate system, θ(k), γ(k) denote the known sonde pitch and yaw, and k may denote an incrementing integer. For sonde tracking purposes, sonde roll angle φ(k) may in some embodiments be ignored. In addition, in some circumstances, an operator of the drill controller 136 may impart force inputs (e.g., noise) to the drilling system that create sonde 102 position and orientation changes. In some embodiments, sonde position and orientation changes attributable to noise at each time interval may lumped into noise terms, denoted as $v_x(k)$, $v_y(k)$, $v_z(k)$, $v_\theta(k)$, $v_\gamma(k)$, with a corresponding correlation matrix Q based, for example, on the physical constraints of the drill string flex and heading change limitations. Matrix Q describes the correlations between all pairs of data sets of $V_k$. State vector $X_{k+1}$, defined below, may be updated by incrementing integer k at every time step while sonde 102 is moving:

$$X_{k+1} = X_k + V_k \quad \text{(Equation 11)}$$

Step 2: A measurement equation matrix may be H(x(k),y(k), z(k), θ(k), γ(k)) may be defined using the previously described walkover optimization (steps 810 and 804). A coordinate system transformation between the sonde coordinate system and the receiver coordinate system accounting for orientation of the sonde 102, with the exception of roll, may be determined by a direction cosine matrix denoted as T(θ(k), γ(k)). A theoretical measurement from a 3-D coil cluster 122 at the receiver position [x(k),y(k),z(k)] due to a single z-axis sonde 102 transmitter can be modeled according to Equation 12:

$$H(x(k), y(k), z(k), \theta(k), \gamma(k)) = \begin{bmatrix} h_x \\ h_y \\ h_z \end{bmatrix} = T(\theta(k), \gamma(k)) \cdot \begin{bmatrix} h_{zx} \\ h_{zy} \\ h_{zz} \end{bmatrix} = \quad \text{(Equation 12)}$$

$$T(\theta(k), \gamma(k)) \cdot \begin{bmatrix} \dfrac{3A_z x(k)z(k)}{[x(k)^2 + y(k)^2 + z(k)^2]^{5/2}} \\ \dfrac{3A_z y(k)z(k)}{[x(k)^2 + y(k)^2 + z(k)^2]^{5/2}} \\ \dfrac{A_z[2z(k)^2 - (x(k)^2 + y(k)^2)]}{[x(k)^2 + y(k)^2 + z(k)^2]^{5/2}} \end{bmatrix}$$

In some embodiments, when two 3-D receiver coil clusters 122 are in active use at the receiver 100, the measurement for left and right receivers 122 may be accounted for in a column vector $Y_k$:

$$Y_k = H(k, X_k) + W \quad \text{(Equation 13)}$$
wherein $$H(k, X_k) = \begin{bmatrix} h_x^l \\ h_y^l \\ h_z^l \\ h_x^r \\ h_x^r \\ h_x^r \end{bmatrix} \quad \text{(Equation 14)}$$

and W is a measurement noise vector with a correlation matrix R, which describes the correlations between all pairs of data sets of W. Further, the notation provided in Equation 14 is defined such that $h_x^l$ describes the x-axis coil measurement of the left receiver on the cart.

Step 3: A matrix of linear approximation equations $C_k$ for a change in the field measurements H about a current trajectory may be constructed according to Equation 15.

$$C_k = \dfrac{\partial H(k, X)}{\partial X}\bigg|_{X = \hat{X}(k/Y_{k-1})} \quad \text{(Equation 15)}$$

wherein the ijth entry of $C_k$ is equal to the partial derivative of the ith component of $C_k$ with respect to the jth component of X.

Step 4: For each iteration according to the common discrete Extended Kalman filter equations (see e.g., Grewal), the following computations may be performed:

$$G_k = P_{k/k-1} \cdot C_k^T \cdot [C_k \cdot P_{k/k-1} \cdot C_k^T + R]^{-1}$$

$$\alpha_k = Y_k - H(\hat{X}_{k/k-1})$$

$$\hat{X}_{k/k} = \hat{X}_{k/k-1} + G_k \cdot \alpha_k$$

$$\hat{X}_{k+1/k} = \hat{X}_{k/k}$$

$$P_{k/k} = (I - G_k \cdot C_k) \cdot P_{k/k-1}$$

$$P_{k+1/k} = P_{k/k} + Q$$

$$k = 1, 2, 3 \quad \text{(Equation 16)}$$

wherein initial conditions, $\hat{X}_{0/0}$, denote the previous position and sonde orientation estimation when sonde is at rest at point a known point (e.g., A 824), and $P_{0/0}$ denotes the a correlation matrix resulting from the optimization confidence estimation.

In some embodiments, the Extended Kalman tracking filter may provides update of the state vector at each update interval in real-time as the sonde is moving from a known point to a subsequent rest position. In some embodiments, this update interval may be at a rate of five updates per second. In further, in some embodiments, for every estimation step, an updated georeferenced position may be computed by rotation and translation of the cart frame into an earth-based frame, so that the placement of the sonde can be constantly reviewed in the selected local spatial coordinates at an operator's discretion (steps 812, 814, 816).

Figure 9:
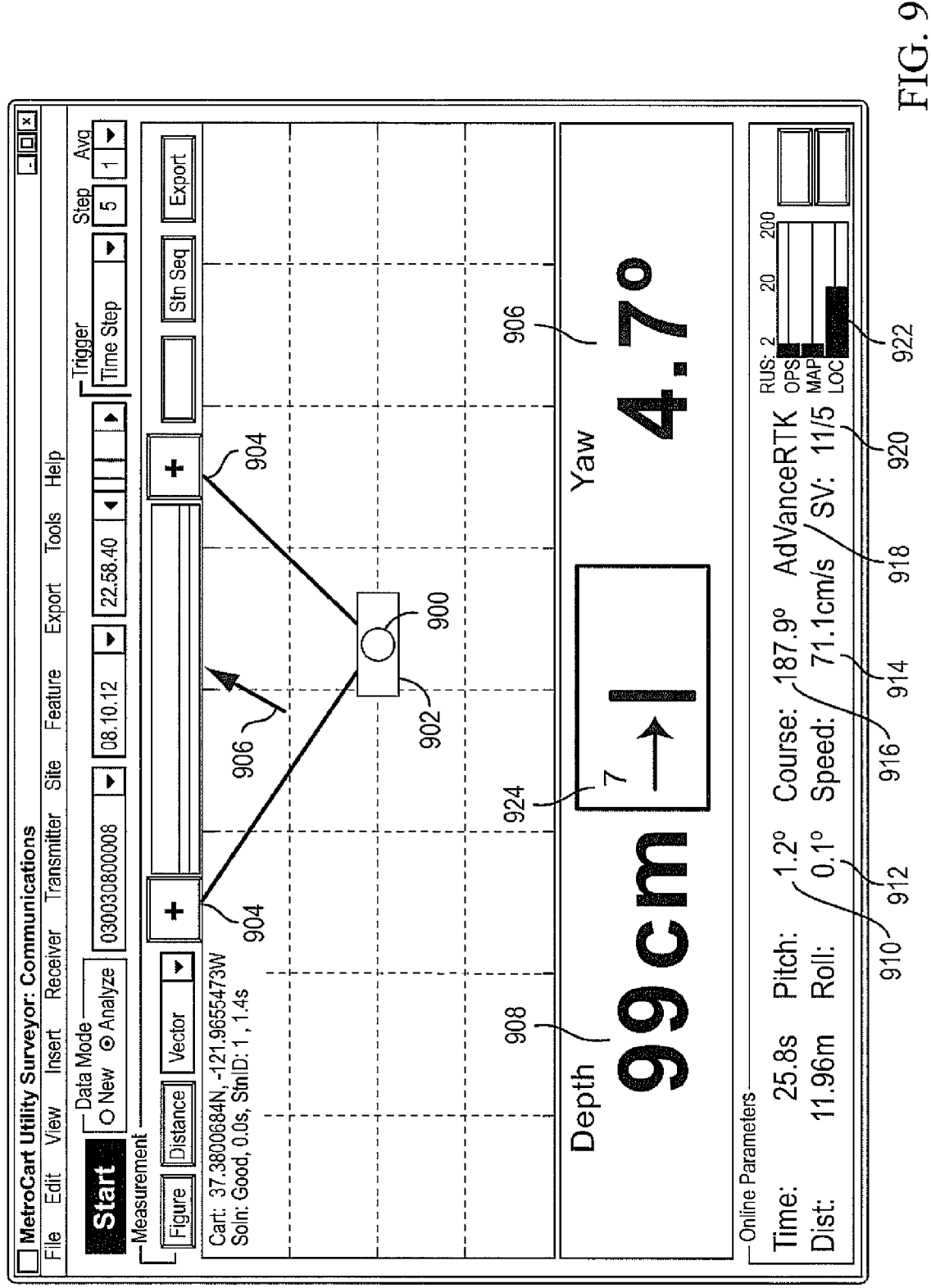
FIG. 9 is an exemplary sonde tracking display used in conjunction with a cart based sonde locating system, when the sonde is actively moving down a drill path, consistent with some embodiments of the present invention.

FIG. 9 is an exemplary sonde tracking display used in conjunction with a cart based sonde locating system 100, when the sonde 102 is actively moving down a drill path, consistent with some embodiments of the present invention. Particularly, the display illustrated in FIG. 9 is from an underground perspective behind the sonde looking forward. The sonde 102 may be represented in the figure by a dark circle 900 located in the middle of the central graph. The current 1σ confidence interval on the sonde vertical and horizontal position may be represented by the shaded rectangle 902 around the sonde 900. In some embodiments, each grid division may be fixed at 50 cm vertically and 20 cm horizontally. Any appropriate-grid spacing, however, may be utilized. In some embodiments, the display illustrated in FIG. 9 is used to monitor the sonde 102 position relative to the locator cart 100 platform, and to view current estimates of the sonde position and orientation (x,y,z,θ,φ,γ).

The wheels 132 of the locate receiver cart 100 may be represented schematically by icons 904, which by color and "±" labels may indicate varying degrees of field distortion detected when the signal select phase angle increases away from a nominal 0°. With the wheels 132 as a reference, the relative placement of the underground sonde 900 can be easily referenced by simple inspection. A further clarifying display element 924 may be used to show the off-axis distance (e.g., the distance away from the center of the cart) in, for example, centimeters, and the direction to steer the cart such that the sonde is directly underground. Depth indication 908 may denote the belowground distance of the sonde.

Yaw angle indication 906 may describe the deviation of the path of the sonde in a level plane from the locator cart 100 direction path. Course indication 916 may represent the heading of the cart with respect to true North. Speed indication 914 may indicate the relative speed of the sonde 102 compared to the locator cart 100 (which also may be stationary or moving). The GPS fix quality of the locator cart may be indicated by indicator 918. In FIG. 9, "AdVanceRTK" indicates a high quality RTK-GPS positioning solution is available, commonly with less than a 2 cm error in map position (1σ confidence). Indication 920 may show the number of GPS satellite vehicles (SV) in view, as well as the number used in determining the geo-reference position of the cart locate receiver 100. Finally, bar graph 922 may provide a quick summary of the cart based sonde locating system 100 accuracy in terms of locate error (LOC), GPS subsystem error, as well as overall positioning error (MAP). Overall map error is typically less than or equal to the GPS error, since the cart may implement embedded dead-reckoning algorithms that utilize a 3-D digital compass, a 3-D inertial measurement unit, and odometers to maintain map precision in areas where the GPS signal is lost. Such dead reckoning methods are described in U.S. Pat. No. 7,120,564, by Gordon Pacey (the '564 patent), U.S. Pat. No. 7,113,124, by James W. Waite, and U.S. Divisional patent application Ser. No. 11/193,100, by James W. Waite and Ruwan Welaratna, all of which are assigned to Metrotech Corporation and herein incorporated by reference in their entireties.

Pitch indication 910 and roll indication 912 may represent estimates of the target sonde 100 orientation. In some embodiments, the estimated roll value (if measured using optimization and an x-axis or y-axis transmitter) may only be accurate when the sonde is stopped and the drill rig stationary. While locator cart 100 platform tilt and roll values are not included in the display illustrated in FIG. 9, these values may be measured and accounted for in translating the cart-based sonde 102 location and orientation measurements to a Earth-based coordinate frame.

Figure 10A:
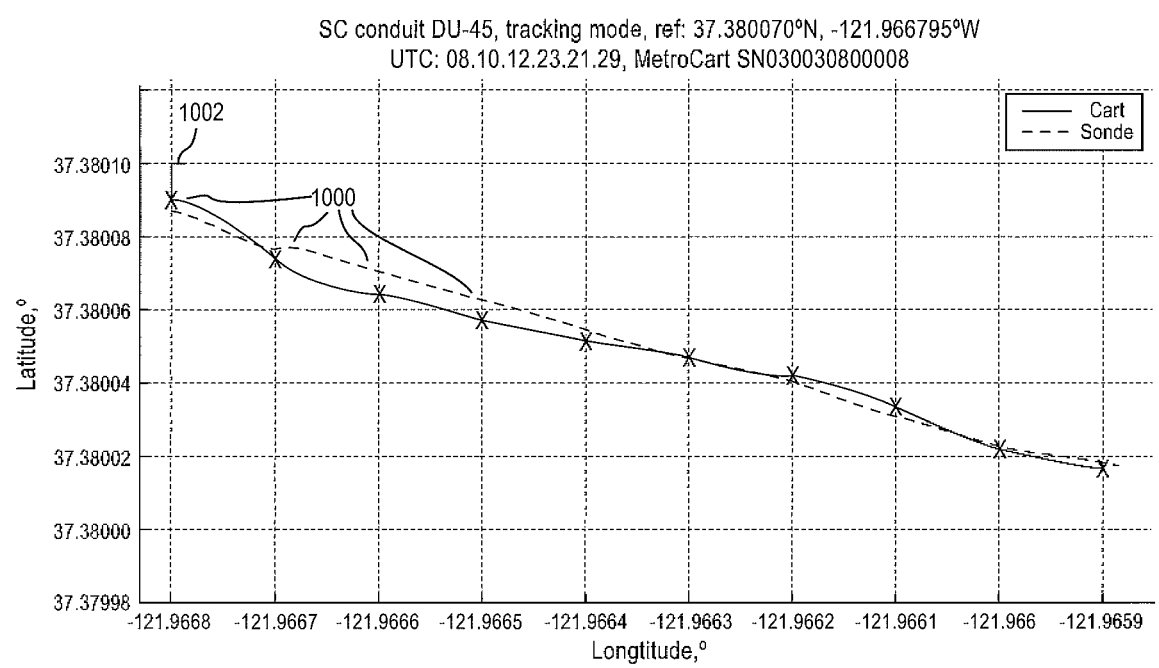
FIG. 10A illustrates an exemplary perspective of a real-time georeferenced map generated during a sonde tracking process when steering along a specific track in 3-dimensional space, consistent with some embodiments of the present invention.
Figure 10B:
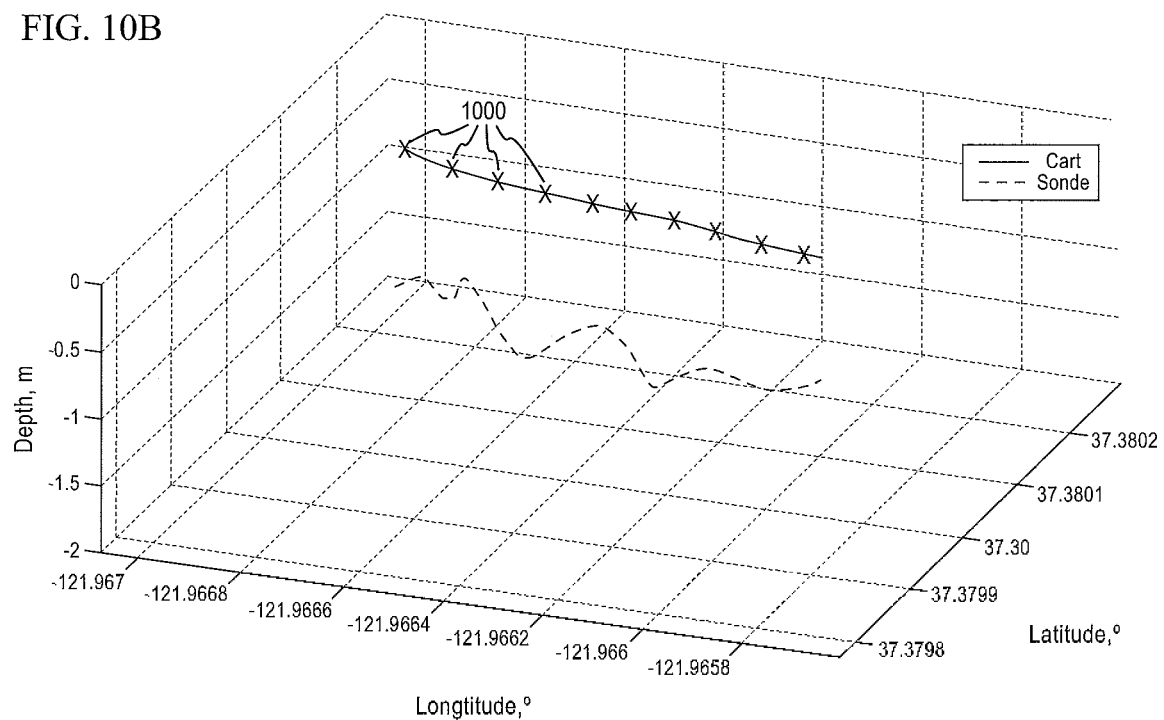
FIG. 10B illustrates another exemplary perspective of a real-time georeferenced map generated during a sonde tracking process when steering along a specific track in 3-dimensional space, consistent with some embodiments of the present invention.

In some circumstances other mapping views may be utilized for monitoring the overall progress of a drill head along a planned drill track. FIGS. 10A and 10B illustrate exemplary perspectives of a real-time georeferenced maps generated during a sonde tracking process when steering along a specific track in 3-D space, consistent with some embodiments of the present invention. Particularly, FIG. 10A illustrates a bird's eye view of both the locator cart 100 track and the underground sonde 102 as both the target sonde 102 and the locator cart 100 progressively move from one end of a drilling operation (starting at the west side) to a terminus 80 m to the east. During the tracking operation, the locator cart 100 may be moved several times between places of rest 1000. As previously discussed, embodiments of the present invention place no restrictions on the geometrical relationship between the locator cart 100 and the sonde transmitter 102. Linear position scale 1002 included in FIG. 10A represents 1 meter in both the north (e.g., vertical) axis and 1 meter in the east (e.g., horizontal) axis, and may be used to describe the side-to-side deviation of the cart from the sonde track. As can be observed in FIG. 10A, the off-axis horizontal deviation of the exemplary cart 100 shown in the figure to the observed sonde position is approximately one meter across an 80 meter drill plan. In some embodiments, FIG. 10A may also include an indication showing the deviation of the observed sonde track from a predefined drill plan (e.g., 822).

When the sonde 102 is moving and the locator cart 100 is stationary, the Kalman tracking filter, discussed above, may provide live updates on the map of the sonde position (x,y,z) and a partial orientation (θ,γ). When the sonde 102 is at rest and the cart moving, walkover data may be collected in accordance with the methods described above in the context of sonde location. At sonde 102 resting points, the cart also rests 1000 and optimization and parameter estimation processes may be performed. Following these calculations, the Kalman tracking filter states may be updated with both updated parameter estimates and their standard deviations. Further, an updated optimal drill path 822 may be calculated and displayed to an operator of console 220. The drill rig operator may also be presented with new position, roll, and pitch estimations. Local data-logging of estimated position and orientation results generated by the sonde locating receiver 100 may be utilized to facilitate GIS system export of the entire 3-D drill track after the drill job is completed.

The above-described "leapfrog process" of sonde locating (e.g., using walkover optimization) and sonde tracking (e.g., using Kalman filtering) may occur successively until the sonde 102 reaches an intended destination at the terminus of the drill path. At any time in this process, a perspective view of the drill track may be available as a display choice, as shown in FIGS. 10A and 10B. As can be seen by inspection of these exemplary mapping plots, there is a ±20 cm deviation in depth of the drill track over the course of the bore, and the path (e.g., as illustrated in FIG. 8A bird's eye view) is nearly straight over the entire directional drill track, following a predefined drill track.

Telemetry of Sonde Temperature and Battery Status

In addition to generating the magnetic field for the y and z transmitter axes, the two higher modulation frequencies (e.g., F2 504 and F3 506 illustrated in FIG. 5A with reference to the frequency F3 502) may be utilized to carry low bandwidth temperature and battery voltage information. Analog levels for both temperature and voltage may be measured locally on the sonde 102. Between designated lower and upper limits, the measured value may be mapped to a frequency in the range 562 (e.g., voltage) and 564 (e.g., temperature). Utilizing these carrier frequencies may change the signal select carrier frequency value and thus may be communicated to the locate receiver 100. Referring to the details of signal select modulation described in the '414 patent, the receiver 100 may utilize a constant estimate of carrier frequency through the numerically controlled oscillator that exists for each PLL (524-528), and thus can perform reverse mapping of frequency to temperature or voltage, as is required. In some embodiments, a typical range for the carrier intervals 562 and 564 is ±0.25% of the carrier frequency.

The first frequency F1 502 of the x-axis transmitter may be kept fixed and be used as a reference frequency. All battery and temperature measurements may be referenced to this frequency, thereby ensuring that sonde 102 frequency drifts due to environmental changes can be tracked and removed from the equations for the measured voltage and temperature. In this manner, the computation of the temperature and battery status may be automatically compensated for any frequency drifts in the sonde transmitter 102. In some embodiments, the higher two frequencies F2 504 and F3 506 for the y-axis and z-axis transmitters can be separated from F1 502 by a progressive fixed increments 558 $\Delta f_2$ and 560 $\Delta f_3$. Denoting $f_C$ as the system clock of the sonde and $f_{TA}$ as the combined temperature and aging crystal drift, frequencies F1, 502, F2 504, and F3 506 may be expressed as follows:

$$F_1 = \frac{f_c + f_{TA}}{R} \quad \text{(Equation 17)}$$

$$F_2 = \frac{f_c + f_{TA}}{R} + \Delta f_2 + Vk_1 \quad \text{(Equation 18)}$$

$$F_3 = \frac{f_c + f_{TA}}{R} + \Delta f_2 + \Delta f_3 + Tk_2 \quad \text{(Equation 19)}$$

wherein R is the division factor to bring the system clock to the nominal signal select center frequency, V is the battery voltage, T is the sonde temperature, and $k_1$, $k_2$ are physical scale factors to scale the values to a frequency range 562, 564. Given the above equations, sonde 102 voltage and temperature may be expressed as follows:

$$V = \frac{F_2 - F_1 - \Delta f_2}{k_1} \qquad \text{(Equation 20)}$$

$$T = \frac{F_3 - F_1 - \Delta f_2 - \Delta f_3}{k_2}. \qquad \text{(Equation 21)}$$

Remote Monitoring of the Sonde Receiver at the Drill Rig Controller

Embodiments of the invention allow information to be wirelessly sent from the sonde locating receiver 100 to the drill rig controller 136 (e.g., as illustrated FIGS. 1 and 2). Standard local computer protocols like Bluetooth, WiFi, and the like may be implemented to achieve this information transfer. Further, a remote display included on the drill rig controller 136 can provide a simple map of sonde position and orientation compared to the an optimal planned track (e.g., 822), which in some embodiments may be similar to the maps included in FIGS. 10A and 10B.

Calibration

Figure 11A:
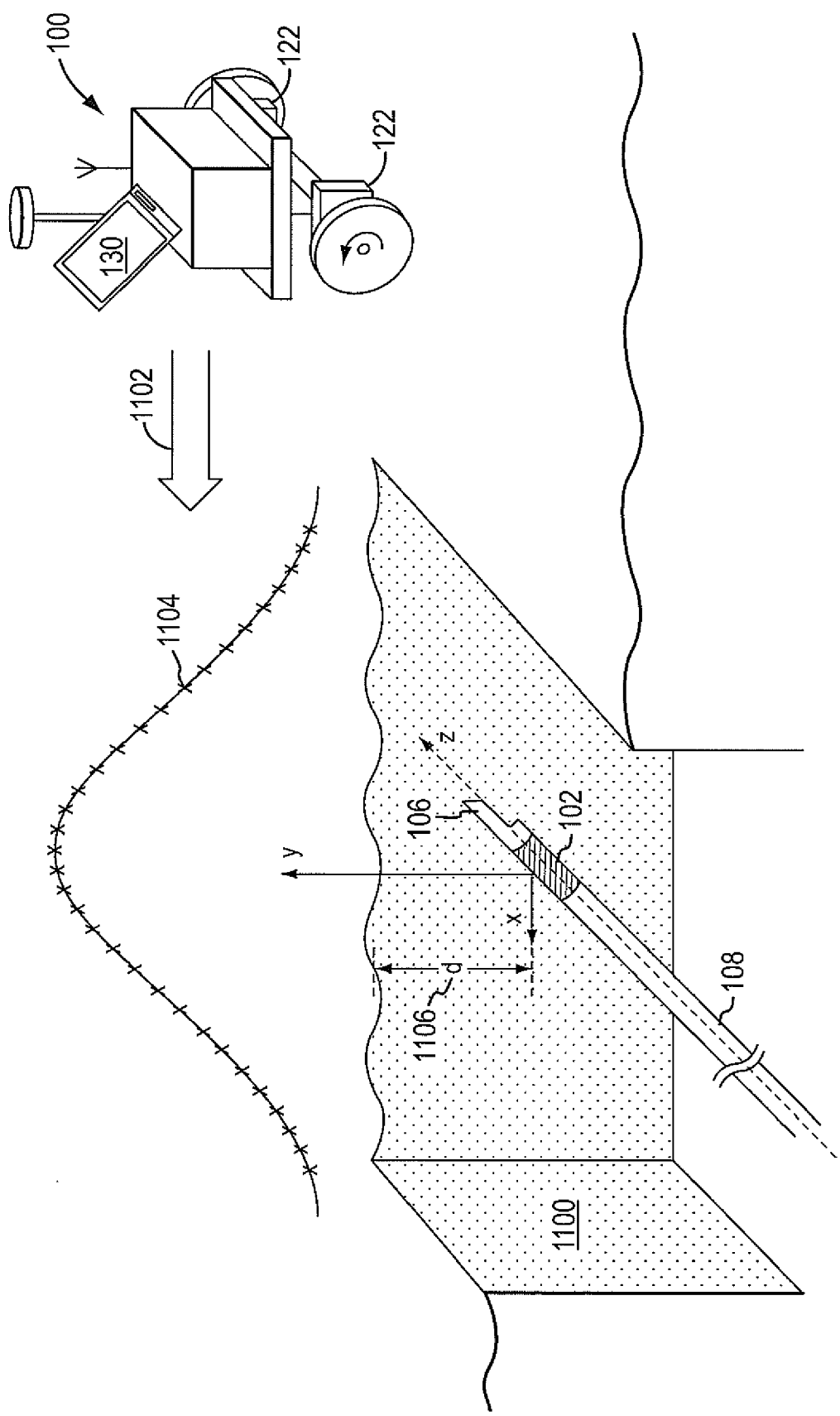
FIG. 11A illustrates the calibration procedure for an exemplary sonde locating receiver when the sonde is placed at a known depth in the ground at an entry pit consistent with embodiments of the present invention.

FIG. 11A illustrates the calibration procedure for an exemplary sonde locating receiver 100 when the sonde 102 is placed at a known depth 1106 in the ground at an entry pit 1100 consistent with embodiments of the present invention. In-situ (e.g., on-site or in ground) calibration of the sonde locating system 100 may be accomplished with the sonde transmitter placed in the drill string 108 at a position behind the drill head 106. With the head of the drill string 108, including the drill head 106 and sonde 102, inserted into the ground at the location of the entry pit 1100, a transverse (e.g., 90° to the direction of the drill string) walkover measurement (denoted by direction 1102) of the known depth d 1106 may be performed across the midsection of the buried sonde at the edge of the pit 1100. Field measurements 1104 may be collected in accordance with the methods described herein. The depth 1106 may be physically measured with a tape measure or the like, and the physically measured depth value d 1106 may be entered into a calibration dialog at the user console/display 130. The sonde locating receiver 100 may simultaneously measure the transverse position as well as recording field strength from all 3 axes, using one or both 3-D EM coil modules 122.

In addition to the depth 1106 being known during calibration, the z-axis intercepts of the walkover for the EM coil modules 122 on both left and right sides may be determined to within a few centimeters accuracy. With the sonde 102 correctly positioned horizontally, the sonde orientation angles may also be approximately zero. During this calibration step, the measured depth value d 1106 may be treated as a known quantity and thus does not appear in the calibration parameter vector b=[A,x,z,θ,ϕ,γ], which differs from the previously discussed parameter vector a in that the normally unknown sonde depth y may be replaced with the unknown field strength scale factor A.

Using the above described measurement process (Step 1: 602-604 in FIG. 6), optimization process (Step 2:608-612 in FIG. 6), and coordinate rotation process (Step 3: 614-618 in FIG. 6), the calibration parameter vector b may be adapted until the minimum mean squared error is sufficiently low. At this point, the calibration of locate receiver 100 may terminate and the constant A may be stored for use by locate receiver 100 in new locate runs for which the depth 1106 is an unknown. During calibration, the limits on the possible values of the orientation can be constrained to small angles (e.g., θ,ϕ,γ may be small) such as, for example, the calibration configuration illustrated in FIG. 11A. It is noted, however, that it is not necessary to maintain either a transverse walkover path or a walkover path directly over the sonde, as the separated left and right 3-D EM coil clusters 122 of locate receiver 100 may still be utilized to measure EM field 104 which can then be compared against model EM fields described by dipole field equations for specific optimized values of A,x,z,θ, and γ through the aforementioned optimization process.

In some embodiments, the constant A may only be utilized on a particular site if current is maintained at a constant value through each sonde transmitter 102 coil for both the calibration and all subsequent locating operations, regardless of battery level. Accordingly, power supply circuit 320 illustrated in FIG. 3B may be adapted to maintain constant transmitter 102 coil current levels.

Figure 11B:
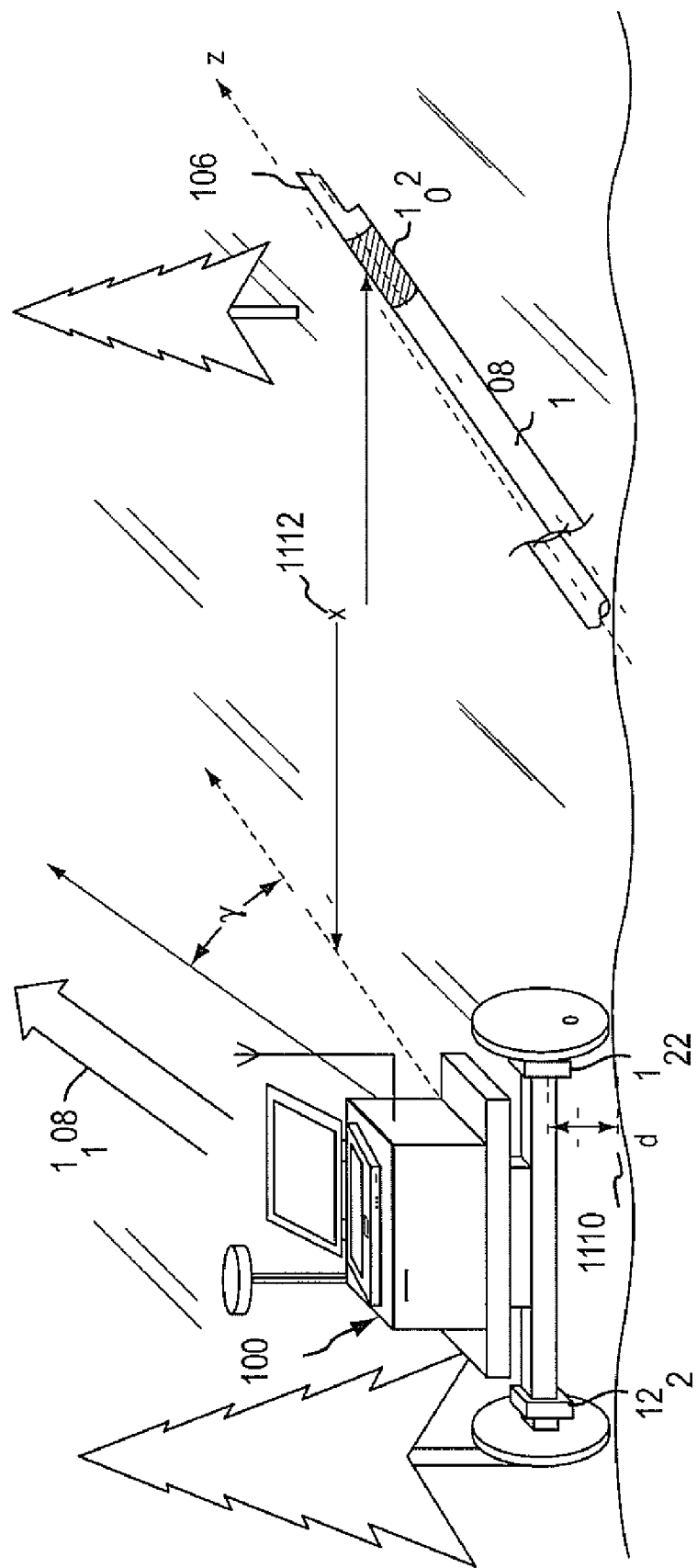
FIG. 11B illustrates the calibration procedure for an exemplary sonde locating receiver when the sonde is placed at an aboveground location consistent with some embodiments of the present invention.

FIG. 11B illustrates the calibration procedure for an exemplary sonde locating receiver when the sonde is placed at an aboveground location consistent with some embodiments of the present invention. The calibration procedure illustrated in FIG. 11B may be utilized when it is not possible to perform an in-situ calibration with the sonde transmitter 102 in the ground. Such situations may arise, for example, if an entry pit 1100 does not exist as is the case when the drill track begins on a slope.

As illustrated in FIG. 11B, cart-based sonde locating receiver 100 may be placed alongside drill string 108 at separation distance x 1112 from sonde transmitter 102. The depth of the sonde referenced to the receiver coil cluster center may be measured as d 1110. In the case of the calibration method illustrated in FIG. 11B, d 1110 may represent the height differential between the center of 3-D EM coil clusters 122 and the center of sonde transmitter 102. As with the in-ground method described above, the value d may be the only absolutely known quantity during calibration, since the user may push the cart 100 as a somewhat oblique angle to the sonde 102 and thus the distance x 1112 may not be a constant. The oblique angle between the cart 100 direction 1108 and the longitude axis of the sonde transmitter may be denoted as yaw y, which can be estimated along with the factor A using the aforementioned calibration process. Cart 100 may be used to perform a walkover locate alongside drill string 108 starting at some arbitrary distance behind sonde 102 and finishing at a distance ahead of the sonde 102. Calibration of locate receiver 100 may then performed similarly to the calibration process described above in reference to FIG. 11B (e.g., using parameter vector b=[A,x,z,θ,ϕ,γ]) but may account for a 90° offset in the estimated yaw angle.

Mapping

In some embodiments, the estimated location and depth of target sonde 102 may be determined using the above described techniques within a cart-based coordinate frame (e.g., rather than a sonde-based coordinate system utilized in Equations 1-9). Utilizing systems for determining the location of cart-based location receiver 100 included within locator receiver electronics 116 (e.g., gyroscopes, accelerometers, internal sensors, and/or digital level sensors), the position of the cart 100 within the cart-based coordinate frame may be determined. Further, systems for determining the location of cart-based location receiver 100 included within locator receiver electronics 116 (e.g., RTK GPS and/or precise survey grade location equipment) may be used to determine the position of the cart 100 within an earth coordinate frame (e.g., a georeferenced coordinate frame). In some embodiments, the estimated location and depth of target sonde 102 is determined in reference to the cart-based coordinate frame and may be translated into an estimated location and depth of target sonde 102 within an earth coordinate frame. In this manner, variations in the position of the cart 100 (e.g., pitch, yaw, and/or roll) may be accounted for in determining the estimated parameters of target sonde 102 within the earth based coordinate frame, which may then be exported to a GIS mapping platform and displayed to a user via display 130.

In some embodiments, prior to the actual boring operation, a drill plan (e.g., a planned drilling path) may be defined in an earth-coordinate frame, representing the desired path of the drill head in three dimensions. At the time of every sonde locate or tracking output of the receiver 100, the location of the target sonde 102 may be translated into the same earth-coordinate frame, and compared to the drill plan which may be pre-loaded into an online map like similar to that displayed in FIGS. 10A and 10B. While drilling is active, using sonde computer console and control and display 130, or with drill rig telemetry system 214-218 and a display on drill rig console and control 220, an operator can view the actual path (e.g., the measured path) in conjunction with the planned path.

The embodiments described herein are examples only of the invention. Other embodiments of the invention that are within the scope and spirit of this disclosure will be apparent to those skilled in the art from consideration of the specification and practice of the invention disclosed herein. It is intended that the specification and examples be considered as exemplary only and not limiting. The scope of the invention, therefore, is limited only by the following claims.

What is claimed is:

1. A method for determining the location and orientation of a sonde, the method comprising:
    measuring a set of complex electromagnetic field magnitude and phase strengths at one or more positions while traversing a target sonde path at any angle using one or more electromagnetic coil sensors;
    modeling a set of expected complex electromagnetic strengths of a hypothetical sonde at each of the one or more positions for one or more of the electromagnetic coil sensors, the set of expected electromagnetic field values corresponding to a model for the target sonde; and
    estimating parameters related to the target sonde based on a residual error between the measured set of complex electromagnetic field values and the modeled set of expected complex electromagnetic field strengths, wherein a final estimated parameter set is determined after the residual error has converged to a minimum tolerance.

2. The method of claim 1, wherein the parameters related to the target sonde include at least:
    a 3-dimensional position of the target sonde relative to one or more of the electromagnetic coil sensors.

3. The method of claim 1, wherein the parameters related to the target sonde include at least:
    a 3-dimensional position of the target sonde relative to one or more of the electromagnetic coil sensors; and
    an off-axis yaw angle of the target sonde from a reference direction relative to one or more of the electromagnetic coil sensors.

4. The method of claim 1, wherein the parameters related to the target sonde include at least:
    a 3-dimensional position of the target sonde relative to one or more of the electromagnetic coil sensors;
    an off-axis yaw angle of the target sonde from a reference direction relative to one or more of the electromagnetic coil sensors; and
    a pitch angle of the target sonde relative to one or more of the electromagnetic coil sensors.

5. The method of claim 1, wherein the target sonde comprises a multi-axis dipole transmitter transmitting at a unique operating frequency per axis.

6. The method of claim 5, wherein the parameters related to the target sonde include at least:
    a 3-dimensional position of the target sonde relative to one or more of the electromagnetic coil sensors;
    an off-axis yaw angle of the target sonde from a reference direction relative to one or more of the electromagnetic coil sensors;
    a pitch angle of the target sonde relative to one or more of the electromagnetic coil sensors; and
    a roll angle of the target sonde about its longitudinal axis.

7. The method of claim 1, wherein modeling the set of expected complex field strengths includes optimizing each of the sets of individual models related to each of the one or more electromagnetic coil sensors at the receiver and each of one or more target sonde target transmitter directions.

8. The method of claim 7, wherein optimizing includes applying a Levenburg-Marquardt algorithm.

9. The method of claim 1, further comprising determining a confidence bound for each of the parameters after the residual error has converged to a minimum tolerance.

10. A method for tracking the location and orientation of a dipole transmitter target sonde between two arbitrary points comprising a known beginning point and a known ending point, comprising:
    computing a first optimal path for the target sonde between the beginning point and the ending point;
    measuring a set of complex electromagnetic field magnitude and phase values at one of a plurality of incremental positions of target sonde following the optimal path using a plurality of electromagnetic coil sensors;
    generating a set of expected complex electromagnetic field values of a hypothetical sonde at the one incremental position based on an extended Kalman filter for each of the electromagnetic coil sensors, the set of expected complex electromagnetic field values corresponding to a model for the target sonde; and
    estimating a revised optimal path of the target sonde from the one incremental position to the ending point based on the residual error between the measured field values and the expected field values.

11. The method of claim 10, wherein a receiver utilized to measure the set of complex electromagnetic field values is fixed aboveground and the target sonde is in motion underground.

12. The method of claim 10, wherein a receiver utilized to measure the set of complex electromagnetic field values is in motion aboveground and the target sonde is fixed underground.

13. The method of claim 10, wherein a receiver utilized to measure the set of complex electromagnetic field values is in motion above ground, the target sonde is in motion underground, and the motion of the receiver is tracked across the ground by a position system.

14. The method of claim 13, wherein the motion of receiver is decoupled from the motion of the target sonde.

* * * * *